US012097518B2

(12) United States Patent
Suzuki

(10) Patent No.: US 12,097,518 B2
(45) Date of Patent: Sep. 24, 2024

(54) DUST SUPPRESSION SYSTEM

(71) Applicant: SUZUKEN KOGYO CO., LTD., Fuefuki (JP)

(72) Inventor: Yasunobu Suzuki, Fuefuki (JP)

(73) Assignee: SUZUKEN KOGYO CO., LTD., Fuefuki (JP)

( * ) Notice: Subject to any disclaimer, the term of this patent is extended or adjusted under 35 U.S.C. 154(b) by 445 days.

(21) Appl. No.: 17/603,178

(22) PCT Filed: Aug. 27, 2020

(86) PCT No.: PCT/JP2020/032310
§ 371 (c)(1),
(2) Date: Apr. 14, 2022

(87) PCT Pub. No.: WO2021/039886
PCT Pub. Date: Mar. 4, 2021

(65) Prior Publication Data

US 2022/0331827 A1 Oct. 20, 2022

(30) Foreign Application Priority Data

Aug. 30, 2019 (JP) ................................ 2019-159089

(51) Int. Cl.
*B05B 13/04* (2006.01)
*B05B 12/12* (2006.01)
*E04G 23/08* (2006.01)

(52) U.S. Cl.
CPC .......... *B05B 13/0421* (2013.01); *B05B 12/12* (2013.01); *E04G 23/08* (2013.01)

(58) Field of Classification Search
CPC ..... B05B 13/0421; B05B 12/12; E04G 23/08; E21F 5/02

(Continued)

(56) References Cited

U.S. PATENT DOCUMENTS 3,628,728 A * 12/1971 Polutnik .................. E21F 5/02 239/159
8,333,333 B2 * 12/2012 Embry ...................... E21F 5/02 239/159

(Continued)

FOREIGN PATENT DOCUMENTS

JP H08-326331 A 12/1996
JP 2008-307516 A 12/2008

(Continued)

OTHER PUBLICATIONS

Oct. 27, 2020 International Search Report issued in International Patent Application No. PCT/JP2020/032310.

*Primary Examiner* — Steven J Ganey
(74) *Attorney, Agent, or Firm* — Oliff PLC

(57) ABSTRACT

A fluid discharger includes: a discharge nozzle configured to discharge fluid; a first rotation device configured to rotate the discharge nozzle; and a control device configured to control the first rotation device by remote operation. The control device includes a first mode control unit including a first automatic control unit configured to automatically perform reciprocating control of the discharge nozzle in a first rotation range set for each of the fluid dischargers; and a first switching unit configured to switch between a control signal to be outputted from the first automatic control unit and a control signal to rotate the discharge nozzle by a first rotation angle designated by remote operation. In a dust suppression system, this configuration can control the direction of the discharge nozzle by remote operation, and also can automatically reciprocate the direction of the discharge nozzle within a predetermined range.

9 Claims, 9 Drawing Sheets

(58) Field of Classification Search
USPC ....... 239/69, 159, 160, 164–166; 169/24, 25
See application file for complete search history.

(56) References Cited

U.S. PATENT DOCUMENTS

| | | | | |
|---|---|---|---|---|
| 8,827,189 | B2 * | 9/2014 | Vanagosoom | F15B 15/065 239/587.1 |
| 2009/0166444 | A1 * | 7/2009 | Peterson | F04D 29/601 239/13 |
| 2011/0232495 | A1 * | 9/2011 | Hutchinson | B01D 47/06 96/256 |
| 2012/0126029 | A1 * | 5/2012 | Koetsier | B05B 3/0427 239/242 |

FOREIGN PATENT DOCUMENTS

| | | | |
|---|---|---|---|
| JP | 2015-227568 | A | 12/2015 |
| JP | 2018-109327 | A | 7/2018 |
| JP | 2018-145689 | A | 9/2018 |

* cited by examiner

DUST SUPPRESSION SYSTEM

TECHNICAL FIELD

The present invention relates to a dust suppression system

BACKGROUND ART

Due to the nature of civil engineering work, construction work, demolition work, and the like, dust and the like (hereinafter, simply referred to as dust_) is often generated at worksites. Particularly in demolition work of (all or part of) buildings (objects to be demolished), generation of dust at work sites is unavoidable. If measures against dust are not taken, not only will working environments deteriorate, but also the dust will be scattered in surrounding areas, causing discomfort to residents living near the site, and in some cases, leading to health hazards. Therefore, various measures have been devised to control dust dispersion during demolition work.

For example, a dust suppression system with a fluid discharger disclosed in Patent Literature 1, in particular, controls the direction(s) of a discharge nozzle(s) of one or more fluid dischargers with two rotation devices by remote operation, and controls, with an open/close valve, the amount of fluid to be discharged, so that the fluid is discharged efficiently and accurately to a work area at a work site.

Therefore, the use of the fluid discharger according to Patent Literature 1 can eliminate the need for a worker who sprays water to suppress the scattering of dust associated with demolition work. In other words, since there can be no need to place such a worker in the vicinity of a work machine performing demolition work, it is possible to limit the exposure of the worker to dust, and make a work environment safer for workers while saving water at work sites.

CITATION LIST

Patent Literature

Patent Literature 1: Japanese Patent Application Laid-Open No. 2015-227568

SUMMARY OF INVENTION

Technical Problem

However, in the fluid discharger shown in Patent Literature 1, the direction of the discharge nozzle is necessary to be controlled by remote operation. Therefore, in a case in which the direction of the discharge nozzle reciprocates within a predetermined range in order to suppress the dust generated from the entirety of a specific area, an operator needs to instruct and control the direction of the discharge nozzle one by one. In other words, in the case of trying to control multiple fluid dischargers, it is necessary to focus solely on the control of fluid dischargers for suppressing the dust generated from the whole specific area. In other words, in such a case, it could be difficult to remotely operate the multiple fluid dischargers effectively.

Therefore, the present invention was made to solve the aforementioned problems, and an object of the present invention is to provide a dust suppression system that can control the direction of a discharge nozzle by remote operation, while automatically reciprocating the direction of the discharge nozzle within a predetermined range.

Solution to Problem

To solve the aforementioned object, the present invention is a dust suppression system including one or more fluid dischargers configured to discharge a fluid capable of suppressing generation of dust to a work area of an object to be worked by remote operation, the fluid discharger including: a discharge nozzle configured to discharge the fluid; a first rotation device configured to rotate the discharge nozzle; and a control device configured to control the first rotation device by remote operation. In this dust suppression system, the control device includes a first mode control unit including a first automatic control unit configured to automatically perform reciprocating control of the discharge nozzle in a first rotation range set for each of the fluid dischargers; and a first switching unit configured to switch between a first automatic signal to be outputted from the first automatic control unit and a first operation signal to rotate the discharge nozzle by a first rotation angle designated by remote operation wherein, the first automatic control unit includes: a first lower limit setting unit configured to set a lower limit angle of the first rotation range; a first upper limit setting unit configured to set an upper limit angle of the first rotation range; a first lower limit comparison unit configured to compare between a first lower limit angle set by the first lower limit setting unit and a first rotation displacement angle outputted from the first rotation device; a first upper limit comparison unit configured to compare between a first upper limit angle set by the first upper limit setting unit and the first rotation displacement angle; and a first signal reversing unit configured to, in a case in which a result of either the first lower limit comparison unit or the first upper limit comparison unit is different from a previous result, reverse the first automatic signal that was outputted last time and output the reversed signal.

In the present invention, the control device includes the first mode control unit including the first automatic control unit configured to automatically perform reciprocating control of the discharge nozzle within the first rotation range, and the first switching unit configured to switch between the first automatic signal to be outputted from the first automatic control unit and the first operation signal to rotate the discharge nozzle by the first rotation angle designated by remote operation. That is, since the first switching unit can switch between the first automatic signal and the first operation signal, it is possible to control the discharge nozzle at the first rotation angle by remote operation, and it is also possible to automatically perform reciprocating control of the discharge nozzle within the first rotation range.

In a case in which the first switching unit is controlled by remote operation, it is possible, by remote operation, to switch between control of the discharge nozzle at the first rotation angle and automatic reciprocating control of the discharge nozzle without physically approaching the fluid discharger, thus saving time and effort (amount of work and man-hours) required to switch between these two.

The discharge nozzle can automatically reciprocates within the first rotation range by simple control at low cost, since the first automatic control unit includes: a first lower limit setting unit configured to set a lower limit angle of the first rotation range; a first upper limit setting unit configured to set an upper limit angle of the first rotation range; a first lower limit comparison unit configured to compare between a first lower limit angle set by the first lower limit setting unit and a first rotation displacement angle outputted from the first rotation device; a first upper limit comparison unit configured to compare between a first upper limit angle set by the first upper limit setting unit and the first rotation displacement angle; and a first signal reversing unit configured to, in a case in which a result of either the first lower limit comparison unit or the first upper limit comparison unit is different from a previous result, reverse the first automatic signal that was outputted last time and output the reversed signal.

In a case in which the first lower limit setting unit and the first upper limit setting unit are set in the fluid discharger, it is possible to eliminate time and effort required to set the first rotation range by remote operation and a configuration for transmitting data of the first rotation range to the fluid discharger, thus promoting cost reduction.

In a case in which the fluid discharger further includes a second rotation device that is controlled by the control unit to rotate the discharge nozzle around a rotational axis orthogonal to a rotational axis of the first rotation device, and the control unit includes a second mode control unit including: a second automatic control unit configured to automatically perform reciprocating control of the discharge nozzle in a second rotation range set for each of the fluid dischargers; and a second switching unit configured to switch between a second automatic signal to be outputted from the second automatic control unit and a second operation signal to rotate the discharge nozzle by a second rotation angle designated by remote operation, the second switching unit can switch between the second automatic signal and the second operation signal, so it is possible to control the discharge nozzle by remote operation at a second rotation angle, and it is also possible to automatically perform reciprocating control of the discharge nozzle within the second rotation range.

In a case in which the second switching unit is controlled by remote operation, it is possible to switch between control of the discharge nozzle at the second rotation angle and automatic reciprocating control of the discharge nozzle by remote operation without physically approaching the fluid discharger, thus saving time and effort (amount of work and man-hours) required to switch between these two.

The discharge nozzle can automatically reciprocates within the second rotation range by simple control at low cost, in a case in which the second automatic control unit includes: a second lower limit setting unit configured to set a lower limit angle of the second rotation range; a second upper limit setting unit configured to set an upper limit angle of the second rotation range; a second lower limit comparison unit configured to compare between a second lower limit angle set by the second lower limit setting unit and a second rotation displacement angle out putted from the second rotation device; a second upper limit comparison unit configured to compare between a second upper limit angle set by the second upper limit setting unit and the second rotation displacement angle; and a second signal reversing unit configured to, in a case in which a result of either the second lower limit comparison unit or the second upper limit comparison unit is different from a previous result, reverse the second automatic signal that was outputted last time and output the reversed signal.

In a case in which the second lower limit setting unit and the second upper limit setting unit are set in the fluid discharger, it is possible to eliminate time and effort required to set the second rotation range by remote operation and a configuration for transmitting data of the second rotation range to the fluid discharger, thus promoting cost reduction.

In a case in which the fluid includes water or a foamy material, when the fluid is water, the object to be worked can be effectively wetted. When the fluid is the foamy material, excessive discharge of water can be avoided, and the amount of water used can be greatly reduced, thus saving water as compared to the case of only sprinkling water.

In the case of performing the remote operation from a single transmitter to the multiple fluid dischargers, the number of workers operating the fluid dischargers can be reduced, and the multiple fluid dischargers can be operated efficiently.

Advantageous Effects of Invention

According to the present invention, in a dust suppression system it is possible to control the direction of a discharge nozzle by remote operation, while automatically reciprocating the direction of the discharge nozzle within a predetermined range. Therefore, it is possible to effectively remotely control multiple fluid dischargers.

DESCRIPTION OF EMBODIMENTS

An example of a first embodiment of the present invention will be herein after described in detail with reference to the drawings.

First, a work site 100 where a dust suppression system 130 according to the present embodiment is used will be described.

Figure 1:
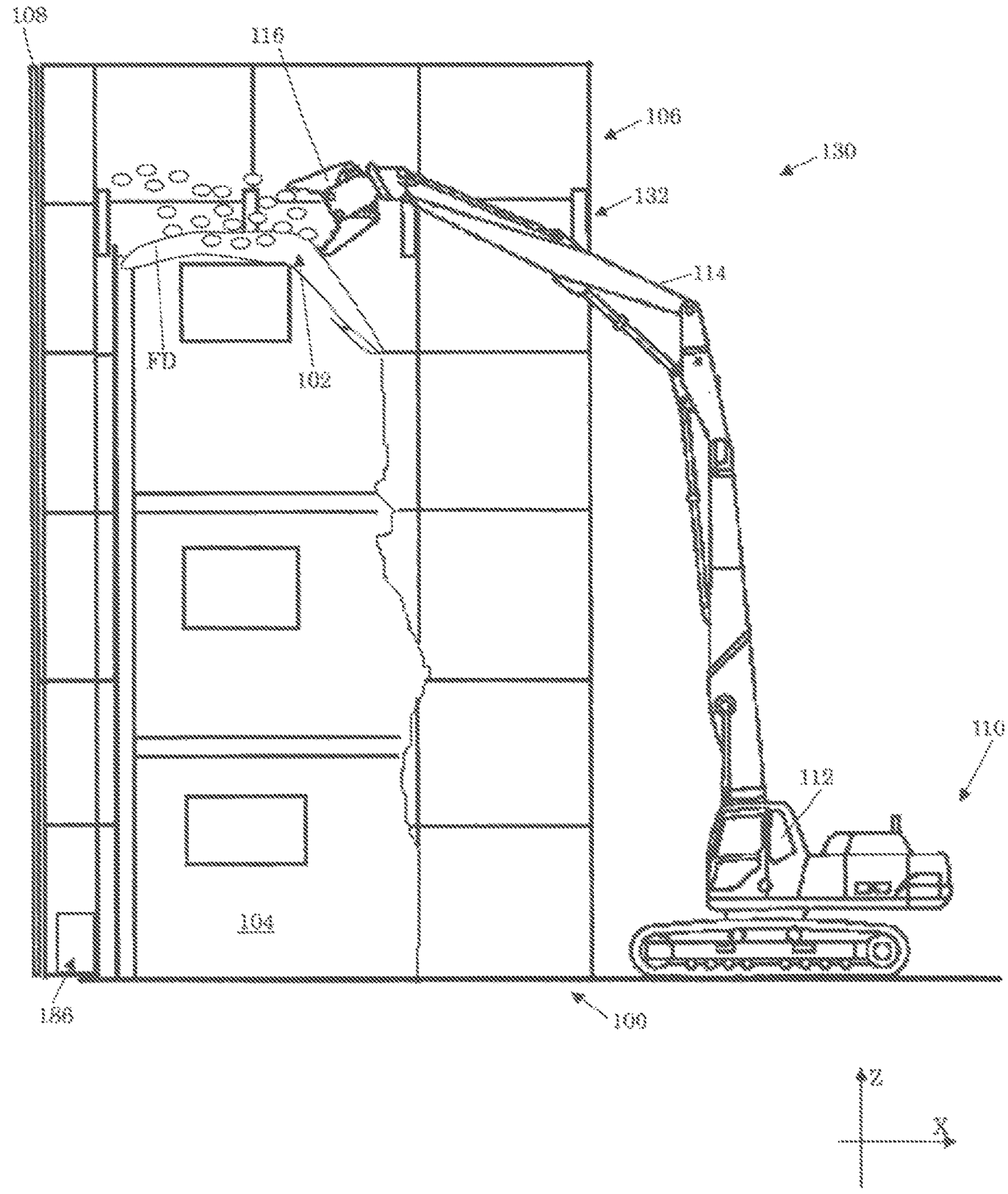
FIG. 1 is a side view illustrating an example of a dust suppression system according to a first embodiment of the present invention used at a work site.

As illustrated in FIG. 1, scaffolding 106 is built around the work site 100, and a curing sheet 108 is attached to the outside of the scaffolding 106. A building 104, which is an object to be worked on, is located at the work site 100 inside the scaffolding 106. In the building 104, a work area 102, which is a part (encircled part) covered with a fluid FD sprayed from a fluid discharger 132 of the dust suppression system 130 to be described later, is demolished by a work machine 110. The work machine 110 can move freely in any direction, for example, by crawler tracks. The work machine 110 is provided with a cab 112. From the cab 112, a work attachment 116 at an end of an arm 114 and the crawler tracks can be freely operated (by a worker or a remotely operated robot in the cab 112). In the present embodiment, the work attachment 116 is a crushing tool, and the work machine 110 is a so-called 'crusher._ The fluid discharger 132 can be remotely operated by a transmitter (not illustrated) brought into the cab 112 (the transmitter may be operated from outside the cab 112). The work area 102 includes an area where the work attachment 116 comes into direct contact with the building 104 and where dust is directly generated by demolition with the work attachment 116. The fluid FD may be water or any flowable foamy material including air bubbles.

Next, the schematic configuration of the dust suppression system 130 according to the present invention will be described with reference to FIGS. 1 and 2A.

Figure 5A:
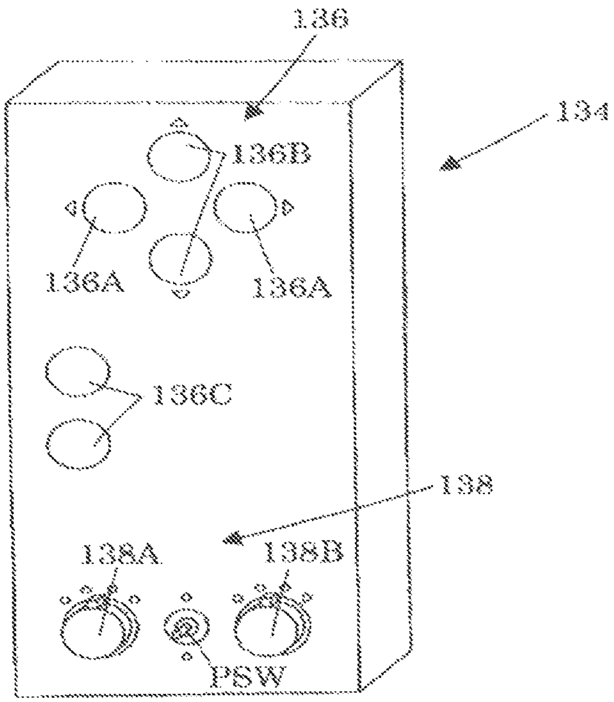
FIG. 5A is a perspective view of a transmitter used in the dust suppression system in FIG. 1.

The dust suppression system 130 has one or more fluid dischargers 132 configured to discharge the fluid FD, capable of suppressing the generation of dust to the work area 102 of the building 104, by remote operation with one transmitter 134 (FIG. 5A). As illustrated in FIG. 2A, the fluid discharger 132 includes a control mechanism 146 configured to control the discharge direction of the fluid FD by receiving a transmission signal SC from the transmitter 134, and a support frame 172 configured to detachably support the control mechanism 146 in its own radial and vertical directions. The fluid discharger 132 includes a discharge nozzle 178D configured to discharge the fluid FD, a first rotation device 166 configured to rotate the discharge nozzle 178D, a second rotation device 168 configured to rotate the discharge nozzle 178D around a rotational axis (axial center O2) orthogonal to the rotational axis (axial center O1) of the first rotation device 166, and a control device 156 (FIG. 3B) configured to control the first rotation device 166 and the second rotation device 168 by remote operation.

In the present embodiment, the output and frequency of the transmitter 134 and a receiver 148 are determined in conformity with the standards of the specified low-power radio station defined by the radio law. Therefore, the transmitter 134 can be remotely operated at a distance of 50 m to 100 m from the fluid discharger 132. In the present embodiment, the fluid discharger 132 is less than 1 m in size (e.g., WL 300 mm j, H 600 mm) and less than 20 kg.

The details of each component (member) of the transmitter 134 and the fluid discharger 132 will be described below.

Figure 3A:
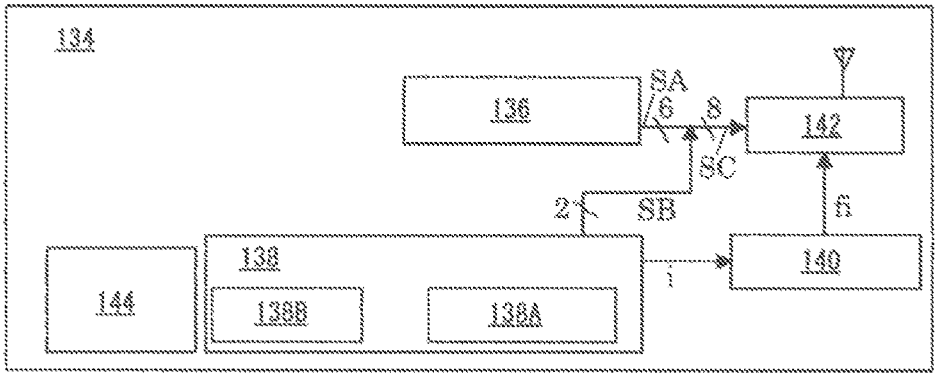
FIG. 3A is a block diagram of a transmitter used in the dust suppression system in FIG. 1.

The transmitter 134 is in a portable rectangular parallelepiped shape as illustrated in FIG. 5A, and has a control signal input 136, a CH selector 138, a local oscillator 140, a modulation circuit 142, and a power supply 144 as illustrated in FIG. 3A. The reference sign PSW is a power switch of the transmitter 134 (also the reference sign PSW in FIG. 5B).

As illustrated in FIG. 5A, the control signal input 136 has two horizontal rotation instruction buttons 136A, two vertical rotation instruction buttons 136B, and two open-close instruction buttons 136C. The horizontal rotation instruction buttons 136A include a button that outputs a signal to instruct right rotation of a rotation member 176 and a button that outputs a signal to instruct left rotation of the rotation member 176. The vertical rotation instruction buttons 136B include a button that outputs a signal to instruct an increase of a first rotation angle j relative to a horizontal direction of the discharge nozzle 178D and a button that outputs a signal to instruct a decrease of the first rotation angle j relative to a horizontal direction of the discharge nozzle 178D. The open-close instruction buttons 136C include a button that outputs a signal to instruct an open state of an open/close valve 170A of a valve drive device 170 (not illustrated) and a button that outputs a signal to instruct a close state of the open/close valve 170A. As illustrated in FIG. 3A, as long as the worker presses any of the buttons, a control signal SA (6-bit signal) corresponding to the button is outputted from the control signal input 136.

In the present embodiment, by simultaneously pressing two of the horizontal rotation instruction buttons 136A and further pressing the upper one of the open-close instruction buttons 136C, it is possible to instruct the rotation member 176 (=discharge nozzle 178D) to automatically reciprocate in the horizontal direction. Conversely, by simultaneously pressing two of the horizontal rotation instruction buttons 136A and further pressing the lower one of the open-close instruction buttons 136C, the automatic reciprocation of the rotation member 176 in the horizontal direction can be canceled and the horizontal rotation of the rotation member 176 can be controlled by an instruction from the transmitter 134. In addition, by simultaneously pressing two of the vertical rotation instruction buttons 136B and further pressing the upper one of the open-close instruction buttons 136C, the automatic reciprocation of the discharge nozzle 178D in the vertical direction can be instructed. Conversely, by simultaneously pressing two of the vertical rotation instruction buttons 136B and further pressing the lower one of the open-close instruction buttons 136C, the automatic reciprocation of the discharge nozzle 178D in the vertical direction can be canceled and the vertical rotation of the discharge nozzle 178D can be controlled by an instruction from the transmitter 134.

As illustrated in FIG. 5A, a CH selector 138 includes a frequency selector 138A, a number select or 138B, and a power switch PSW, and outputs a signal identifying a fluid discharger 132 to be controlled. As illustrated in FIG. 3A, the frequency selector 138A provides an output to determine one of a plurality of carrier frequencies fi (i=1 to 4 in the present embodiment) provided in a specific frequency band handled in the local oscillator 140. The number selector 138B provides an output that defines one of the numbers j (j=1 to 4 in the present embodiment) for identifying the fluid discharger 132. Therefore, up to 16 (=4*4) fluid dischargers 132 can be identified by selection of the CH selector 138, and different identification signals SB can be transmitted to the respective fluid dischargers 132. In the present embodiment, the 6-bit control signal SA from the control signal input 136 and the 2-bit identification signal SB from the number select or 138B generate an 8-bit transmission signal SC.

As illustrated in FIG. 3A, the local oscillator 140 is connected to an output of the CH selector 138, and generates and outputs a carrier frequency fi determined by the frequency selector 138A.

As illustrated in FIG. 3A, the modulation circuit 142 is connected to an output of the control signal input 136, an output of the CH selector 138, and an output of the local oscillator 140. The modulation circuit 142 is configured to modulate the carrier frequency fi with the transmission signal SC and radiate the modulated carrier frequency as a radio wave from an antenna. The power supply 144 is specifically a battery of various types, and supplies necessary power to each of the above-described components of the transmitter 134.

Figure 3B:
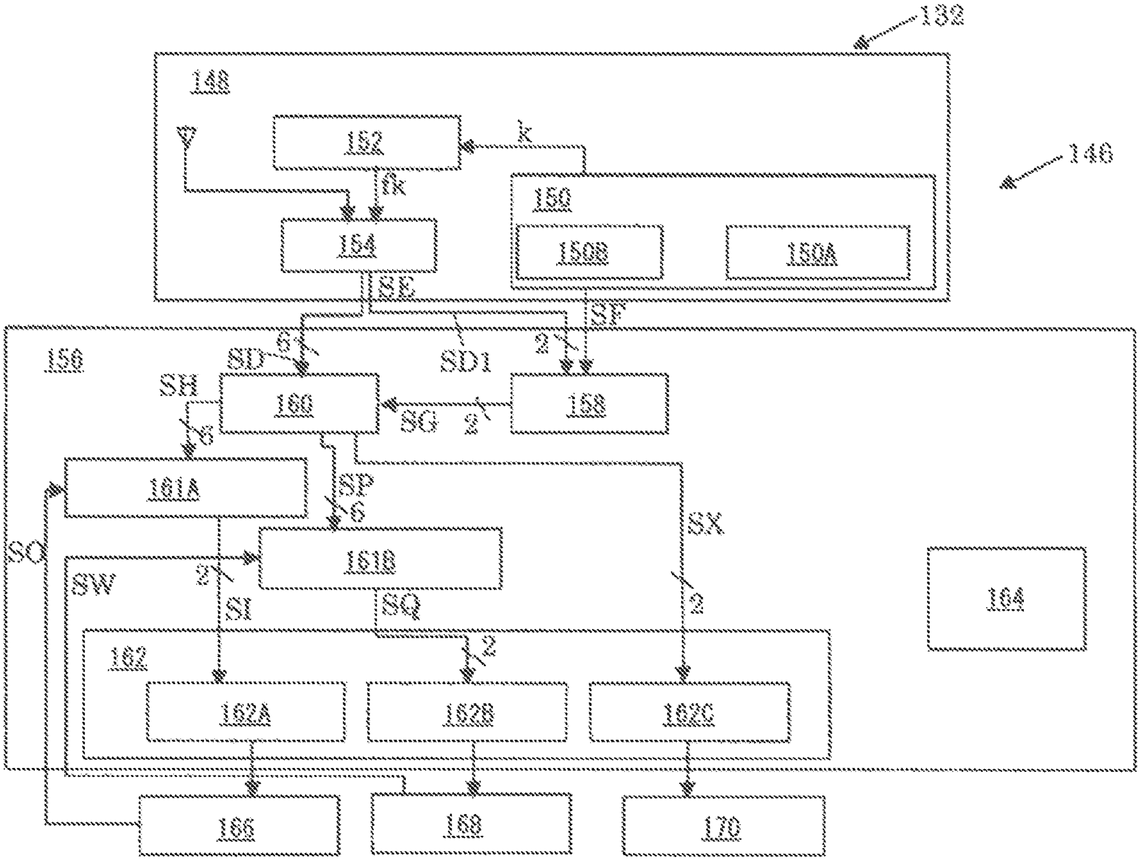
FIG. 3B is a block diagram of the fluid discharger in FIG. 2A.

As illustrated in FIG. 3B, the control mechanism 146 of the fluid discharger 132 includes the receiver 148, the control device 156, the first rotation device 166, the second rotation device 168, and the valve drive device 170.

Figure 5B:
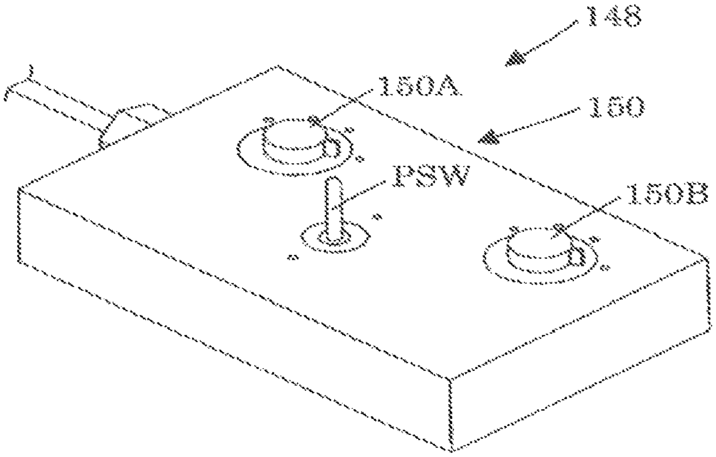
FIG. 5B is a perspective view of a receiver of the fluid discharger in FIG. 2A.

The receiver 148 is in a rectangular parallelepiped shape as illustrated in FIG. 5B, and the receiver 148 is configured integrally with the control device 156. As illustrated in FIG. 3B, the receiver 148 has a CH selector 150, a local oscillator 152, and a demodulator circuit 154, and receives the transmission signal SC from the transmitter 134.

As illustrated in FIG. 5B, the CH selector 150 includes a frequency selector 150A, a number selector 150B, and a power switch PSW. The frequency selector 150A and the number selector 150B have the same function as those of the frequency selector 138A and the number selector 138B, respectively, so the description thereof is omitted. The number selector 150B outputs a 2-bit identification signal SF to the control device 156. The local oscillator 152 illustrated in FIG. 3B has the same function as that of the local oscillator 140, so the description thereof is omitted.

As illustrated in FIG. 3B, the demodulator circuit 154 has the function of demodulating the radio wave received by the antenna and outputting an 8-bit reception signal SE to the control device 156. In other words, in a case in which a carrier frequency fk (k=1 to 4 in the present embodiment) identified by the frequency selector 150A is the same as the carrier frequency fi (fk=fi) and the identification signal SF is the same as the identification signal SB (SF=SB), a demodulated reception signal SE is the same as the transmission signal SC (SE=SC). In a case in which the carrier frequency fk is not the same as the carrier frequency fi, the radio wave received by the antenna is not demodulated and the demodulator circuit 154 does not output the reception signal SE.

As illustrated in FIG. 3B, the control device 156 includes a logic circuit 158, a switch circuit 160, a first mode control unit 161A, a second mode control unit 161B, a drive circuit 162, and a power supply 164. The controller 156 controls the first rotation device 166, the second rotation device 168, and the valve drive device 170 according to the reception signal SE outputted from the receiver 148.

As illustrated in FIG. 3B, the logic circuit 158 is connected to an output of the demodulator circuit 154 of the receiver 148 and an output of the CH selector 150 thereof. With the identification signal SF, the logic circuit 158 discerns an identification signal SD1, which identifies a fluid discharger 132, from the reception signal SE. In other words, the logic circuit 158 compares the 2-bit identification signal SD1 of the reception signal SE with the 2-bit identification signal SF from the number selector 150B of the CH selector 150. The logic circuit 158 outputs an ON signal as a control signal SG in a case in which the identification signal SD1 and the identification signal SF are the same as each other, and outputs an OFF signal as the control signal SG in a case in which the identification signal SD1 and the identification signal SF are different from each other.

As illustrated in FIG. 3B, the switch circuit 160 is connected to an output of the demodulator circuit 154 and an output of the logic circuit 158. The switch circuit 160 conducts the turning ON/OFF of a control signal SD, which controls the first rotation device 166, the second rotation device 168, and the valve drive device 170, of the reception signal SE according to an output of the logic circuit 158. In other words, the switch circuit 160 conducts the turning ON/OFF of the 6-bit control signal SD by an ON/OFF signal from the logic circuit 158. That is, in a case in which the setting of the CH selector 138 of the transmitter 134 and the setting of the CH selector 150 of the receiver 148 are the same as each other, the 6-bit control signal SA (=SD, SH, SP), inputted by the control signal input 136 of the transmitter 134, and a 2-bit control signal SX are outputted from the switch circuit 160. The control signal SX is a 2-bit signal corresponding to the two open-close instruction buttons 136C.

Figure 4A:
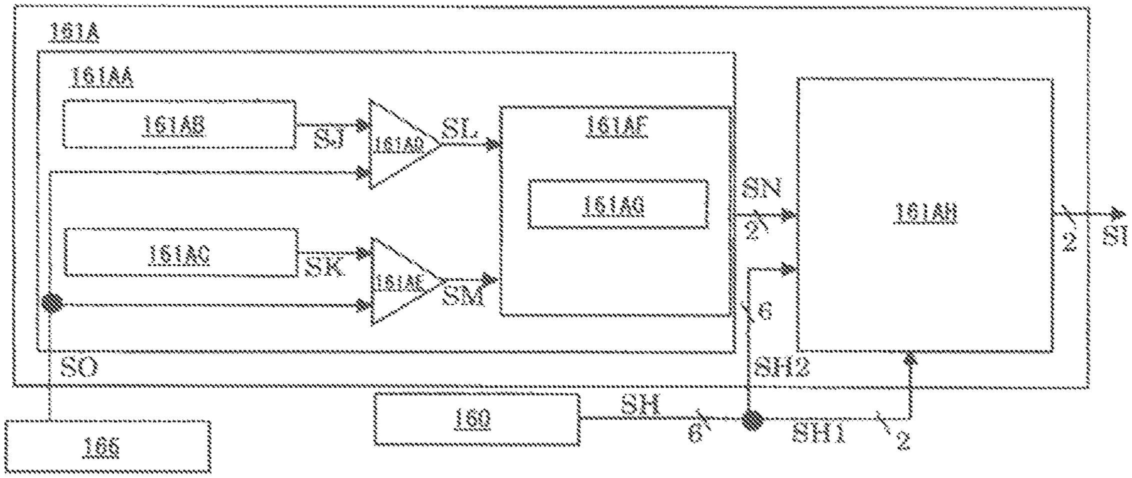
FIG. 4A is a block diagram of a first mode control unit of a control device of the fluid discharger in FIG. 3B.

As illustrated in FIG. 3B, the first mode control unit 161A is connected to the switch circuit 160 and an output of the first rotation device 166. The first mode control unit 161A outputs a control signal SI to the first drive circuit 162A. As illustrated in FIG. 4A, the first mode control unit 161A includes a first automatic control unit 161AA and a first switching unit 161AH. The first automatic control unit 161AA automatically controls the discharge nozzle 178D to reciprocate in a first rotation range jr, which is set for each fluid discharger 132. The first switching unit 161AH switches between a control signal (first automatic signal) SN, outputted from the first automatic control unit 161AA, and a control signal (first operation signal) SH2 to rotate the discharge nozzle 178D by the first rotation angle j designated by remote operation. For this reason, a case in which the first switching unit 161AH outputs the control signal SN is referred to as a first automatic mode, and a case in which the first switching unit 161AH outputs the control signal SH2 is referred to as a first manual mode. A first rotation displacement angle j0 refers to a rotation angle of the discharge nozzle 178D outputted from the first rotation device 166, and the first rotation displacement angle j0 is obtained by a displacement signal SO from a potentiometer attached to (a first rotation shaft 166A of) the first rotation device 166.

Figure 5C:
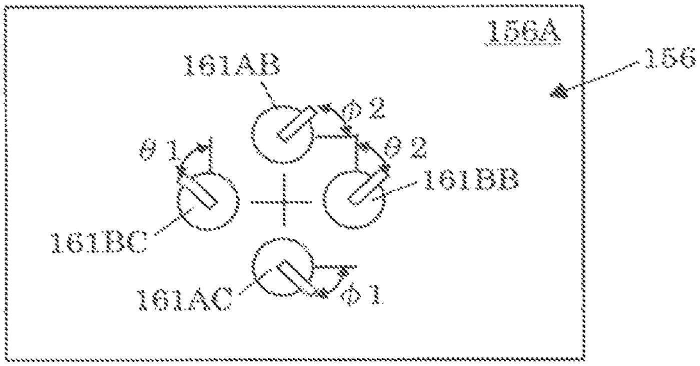
FIG. 5C is a plan view illustrating an input part of the control unit of the fluid discharger in FIG. 2A.

Here, as illustrated in FIG. 4A, the first automatic control unit 161AA has a first lower limit setting unit 161AC, a first upper limit setting unit 161AB, a first lower limit comparison unit 161AE, a first upper limit comparison unit 161AD, and a first signal reversing unit 161AF. The first lower limit setting unit 161AC and the first upper limit setting unit 161AB are, for example, variable resistors, and as illustrated in FIG. 5C, the first lower limit setting unit 161AC and the first upper limit setting unit 161AB are set at an input unit 156A of the control device 156 of the fluid discharger 132. The input unit 156A is provided at a position visible from outside the fluid discharger 132.

As illustrated in FIG. 5C, the first lower limit setting unit 161AC sets a lower limit angle (first lower limit angle) j1 of the first rotation range jr by specifying an angle j1 downward from a center angle jC (for example, in the case of the center angle jC=0, the angle j1 is a negative value). The signal set at this time is referred to as a lower limit signal SK. In the same manner, the first upper limit setting unit 161AB sets an upper limit angle (first upper limit angle) j2 of the first rotation range jr by specifying an angle j2 upward from the center angle jC (for example, in the case of the center angle jC=0, the angle j2 is a positive value). The signal set at this time is referred to as an upper limit signal SJ. As a result, the first rotation range jr is −j1+j2. The center angle jC (=0) can be set to an angle exactly at the center of a rotatable range of the discharge nozzle 178D.

As illustrated in FIG. 4A, the first lower limit comparison unit 161AE compares the first lower limit angle j1, set by the first lower limit setting unit 161AC, with a first rotation displacement angle j0 (for example, in a case in which the first rotation displacement angle j0 is the central angle jC, the first rotation displacement angle j0 is zero). The first lower limit comparison unit 161AE, for example, outputs a H-level control signal SM in a case in which the first rotation displacement angle j0 is the same as or less than the first lower limit angle j1. Conversely, in a case in which the first rotation displacement angle j0 is greater than the first lower limit angle j1, the first lower limit comparison unit 161AE outputs a L-level control signal SM. The first upper limit comparison unit 161AD compares the first upper limit angle j2, set by the first upper limit setting unit 161AB, with the first rotation displacement angle j0. The first upper limit comparison unit 161AD, for example, outputs a H-level control signal SL in a case in which the first rotation displacement angle j0 is the same as or greater than the first upper limit angle j2. Conversely, in a case in which the first rotation displacement angle j0 is less than the first upper limit angle j2, the first upper limit comparison unit 161AD outputs a L-level control signal SL.

In a case in which a result of either the first lower limit comparison unit 161AE or the first upper limit comparison unit 161AD is different from a previous result, the first signal reversing unit 161AF, illustrated in FIG. 4A, reverses and outputs the control signal SN that was previously outputted. In other words, for example, in a case in which the first rotation displacement angle j0 is the same as or less than the first lower limit angle j1, the first rotation displacement angle j0 is less than the first upper limit angle j2, and the control signal SM is the H level and the control signal SL is the L level. In this case, the 2-bit control signal SN that has been outputted to the first switching unit 161AH is reversed (for example, in a case in which control signals SN1 and SN2 are the H level and the L level, the control signals SN1 and SN2 are made to be the L level and the H level, respectively). After reversing, the control signal SN remains outputted and unchanged until the first rotation displacement angle j0 becomes greater than the first lower limit angle j1 and the first rotation displacement angle j0 becomes the same as or greater than the first upper limit angle j2. In a case in which the first rotation displacement angle j0 becomes the same as or greater than the first upper limit angle j2, the first rotation displacement angle j0 is greater than the first lower limit angle j1, so the control signal SM becomes the L level and the control signal SL becomes the H level. At this time, the 2-bit control signal SN that had been outputted to the first switching unit 161AH is further reversed. During automatic driving, this operation is repeated.

Figure 4B:
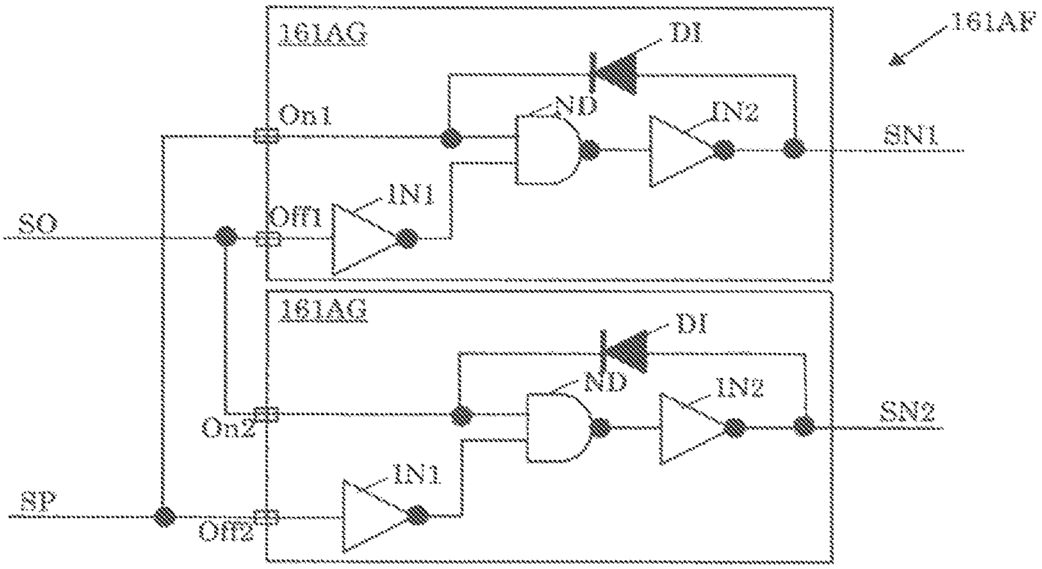
FIG. 4B is a block diagram of a signal reversing unit of the first mode control unit in FIG. 4A.

For this purpose, as illustrated in FIG. 4B, the first signal reversing unit 161AF is constituted of, for example, a combination of two signal holding units 161AG. In principle, ON-side terminals On1 and On2 and OFF-side terminals Off1 and Off2 of the two signal holding units 161AG are connected in parallel by crossing each other, so that the control signal SN1 or the control signal SN2 outputted is the H level. For example, the upper bits of the control signal SN can be used as the control signal SN1 and the lower bits of the control signal SN can be used as the control signal SN2.

For example, as illustrated in FIG. 4B, the signal holding unit 161AG is constituted of two NOT circuits IN1 and IN2, a NAND circuit ND, and a diode DI. In a case in which both of the control signals SL and SM become the L level, only the control signal (SN1 or SN2) of the signal holding unit 161AG, which was the H level at the ON-side terminal On1 or On2 immediately before becoming the L level, is configured to be kept at the H level.

The first switching unit 161AH illustrated in FIG. 4A switches between outputting the control signal SN as the control signal SI and the control signal SH2 as the control signal SI, depending on the pattern of the 6-bit control signal SH (=SH1) outputted from the switch circuit 160. In other words, the control signal SN is outputted as the control signal SI in a case in which the vertical rotation instruction buttons 136B are simultaneously pressed along with the upper one of the open-close instruction buttons 136C on the transmitter 134. That is, vertical reciprocation of the discharge nozzle 178D is automatically performed. Alternatively, in a case in which the vertical rotation instruction buttons 136B are pressed simultaneously along with the lower one of the open-close instruction buttons 136C on the transmitter 134, the control signal SH2 is outputted as the control signal SI. That is, the vertical angle of the discharge nozzle 178D can be instructed by remote operation on the transmitter 134. Thereby, the vertical rotation of the discharge nozzle 178D can be controlled by determination between the first automatic mode and the first manual mode by remote operation on the transmitter 134. In other words, in the present embodiment, the first switching unit 161AH is configured to be controlled by remote operation. The control signal SH2 is a 2-bit signal corresponding to the two vertical rotation instruction buttons 136B.

Figure 4C:
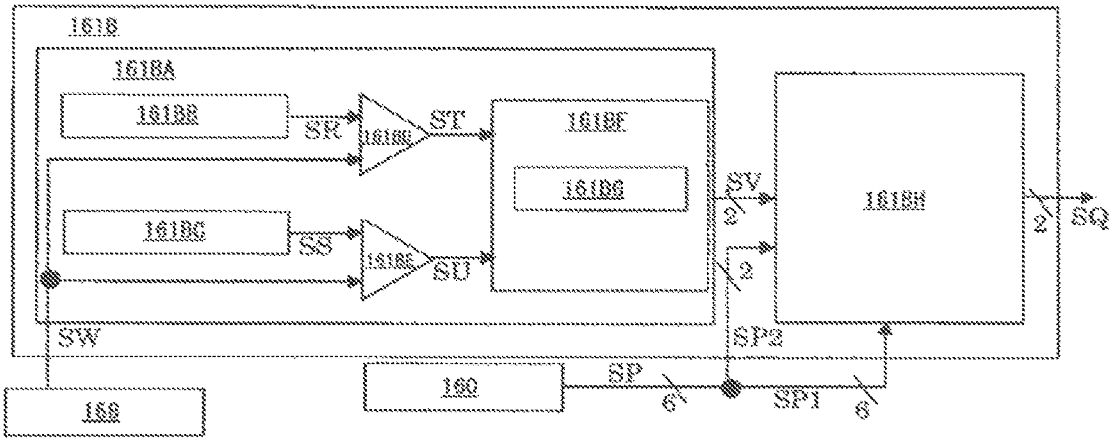
FIG. 4C is a block diagram of a second mode control unit of the control device of the fluid discharger in FIG. 3B.

As illustrated in FIG. 3B, the second mode control unit 161B is connected to the switch circuit 160 and an output of the second rotation device 168. The second mode control unit 161B outputs a control signal SQ to a second drive circuit 162B. As illustrated in FIG. 4C, the second mode control unit 161B includes a second automatic control unit 161BA and a second switching unit 161BH. Here, the second automatic control unit 161BA includes a second lower limit setting unit 161BC, a second upper limit setting unit 161BB, a second lower limit comparison unit 161BE, a second upper limit comparison unit 161BD, and a second signal reversing unit 161BF. In other words, the second mode control unit 161B has almost the same configuration and function as those of the first mode control unit 161A. Therefore, the description of each element of the second mode control unit 161B is omitted.

A second automatic signal is a control signal SV outputted from the second automatic control unit 161BA. A second operation signal is a control signal SP2 to rotate the discharge nozzle 178D by a second rotation angle q designated by remote operation. For this reason, a case in which the second switching unit 161BH outputs the control signal SV is referred to as a second automatic mode, and a case in which the second switching unit 161BH outputs the control signal SP2 is referred to as a second manual mode. A second rotation displacement angle q0 refers to a rotation angle of the discharge nozzle 178D outputted from the second rotation device 168, and the second rotation displacement angle q0 is obtained by a displacement signal SW from a potentiometer attached to (a second rotation shaft 168A of) the second rotation device 168.

As illustrated in FIG. 5C, the second lower limit setting unit 161BC and the second upper limit setting unit 161BB are also set at the input unit 156A of the control device 156 of the fluid discharger 132.

As illustrated in FIG. 5C, the second lower limit setting unit 161BC sets a lower limit angle (second lower limit angle) q1 of a second rotation range qr by specifying an angle q1 to the left from a center angle qC (for example, in the case of the center angle qC=0, the angle q1 is a negative value). The signal set at this time is referred to as a lower limit signal SS. In the same manner, the second upper limit setting unit 161BB sets an upper limit angle (second upper limit angle) q2 of the second rotation range qr by specifying an angle q2 to the right from the center angle qC (for example, in the case of the center angle qC=0, the angle q2 is a positive value). The signal set at this time is referred to as an upper limit signal SR. As a result, the second rotation range qr is −q1+q2. The center angle qC (=0) can be set to an angle exactly at the center of a rotatable range of the rotation member 176.

The second lower limit comparison unit 161BE illustrated in FIG. 4C, for example, outputs a H-level control signal SU in a case in which the second rotation displacement angle q0 is the same as or less than the second lower limit angle q1. Conversely, in a case in which the second rotation displacement angle q0 is greater than the second lower limit angle q1, the second lower limit comparison unit 161BE outputs a L-level control signal SU. The second upper limit comparison unit 161BD, for example, outputs a H-level control signal ST in a case in which the second rotation displacement angle q0 is the same as or greater than the second upper limit angle q2. Conversely, in a case in which the second rotation displacement angle q0 is less than the second upper limit angle q2, the second upper limit comparison unit 161BD outputs a L-level control signal ST.

The second signal reversing unit 161BF illustrated in FIG. 4C has the sane configuration as that of the first signal reversing unit 161AF and, for example, in a case in which the second rotation displacement angle q0 is the same as or less than the second lower limit angle q1, the second rotation displacement angle q0 is less than the second upper limit angle q2, and the control signal SU is the H level and the control signal ST is the L level. In this case, the 2-bit control signal SV that has been outputted to the second switching unit 161BH is reversed (for example, in a case in which the control signals SV1 and SV2 are the H level and the L level, the control signals SV1 and SV2 are made to be the L level and the H level, respectively). After reversing, the control signal SV remains outputted and unchanged until the second rotation displacement angle q0 becomes greater than the second lower limit angle q1 and the second rotation displacement angle q0 becomes the same as or greater than the second upper limit angle q2. In a case in which the second rotation displacement angle q0 becomes the same as or greater than the second upper limit angle q2, the second rotation displacement angle q0 is greater than the second lower limit angle q1, so the control signal SU becomes the L level and the control signal ST becomes the H level. At this time, the 2-bit control signal SV that had been outputted to the second switching unit 161BH is further reversed. During automatic driving, this operation is repeated. Since the configuration of the second signal reversing unit 161BF is the same as that of the first signal reversing unit 161AF, the description thereof is omitted.

The second switching unit 161BH illustrated in FIG. 4C outputs the control signal SV as the control signal SQ in a case in which the horizontal rotation instruction buttons 136A are simultaneously pressed along with the upper one of the open-close instruction buttons 136C on the transmitter 134. That is, the horizontal reciprocation of the discharge nozzle 178D is automatically performed.

Alternatively, in a case in which the horizontal rotation instruction buttons 136A are pressed simultaneously along with the lower one of the open-close instruction buttons 136C on the transmitter 134, the control signal SP2 is outputted as the control signal SQ. That is, the horizontal angle of the discharge nozzle 178D can be instructed by remote operation on the transmitter 134.

Thereby, the horizontal rotation of the discharge nozzle 178D can be controlled by determination between the second automatic mode and the second manual mode by remote operation on the transmitter 134. In other words, in the present embodiment, the second switching unit 161BH is configured to be controlled by remote operation. The control signal SP2 is a 2-bit signal corresponding to the two horizontal rotation instruction buttons 136A.

As illustrated in FIG. 3B, the drive circuit 162 is connected to the outputs of the first mode control unit 161A, the second mode control unit 161B, and the switch circuit 160, and has a first drive circuit 162A, a second drive circuit 162B, and a valve drive circuit 162C. The output of the first drive circuit 162A is connected to the first rotation device 166. The first drive circuit 162A drives the first rotation device 166 in accordance with the control signal SI. The second drive circuit 162B is connected to the second rotation device 168. The output of the second drive circuit 162B drives the second rotation device 168 in accordance with the control signal SQ. The output of the valve drive circuit 162C is connected to the valve drive device 170. The valve drive circuit 162C drives the valve drive device 170 in accordance with a control signal SX. In other words, the drive circuit 162 drives the first rotation device 166, the second rotation device 168, and the valve drive device 170 on the basis of the 2-bit control signals SI, SQ and SX, respectively.

The power supply unit 164 supplies power to the receiver 148, the logic circuit 158, the switch circuit 160, the first mode control unit 161A, the second mode control unit 161B, and the drive circuit 162. The power supply 164 includes a power adapter 164A and a rechargeable battery 164B, illustrated in FIG. 2A. Thus, power is supplied directly from an AC outlet (AC 100 V) with the power adapter 164A. Alternatively, the rechargeable battery 164B (for example, DC 12 V) can be used as a power supply. In the present embodiment, power of 60 W or more can be supplied as the power supply 164.

Figure 2A:
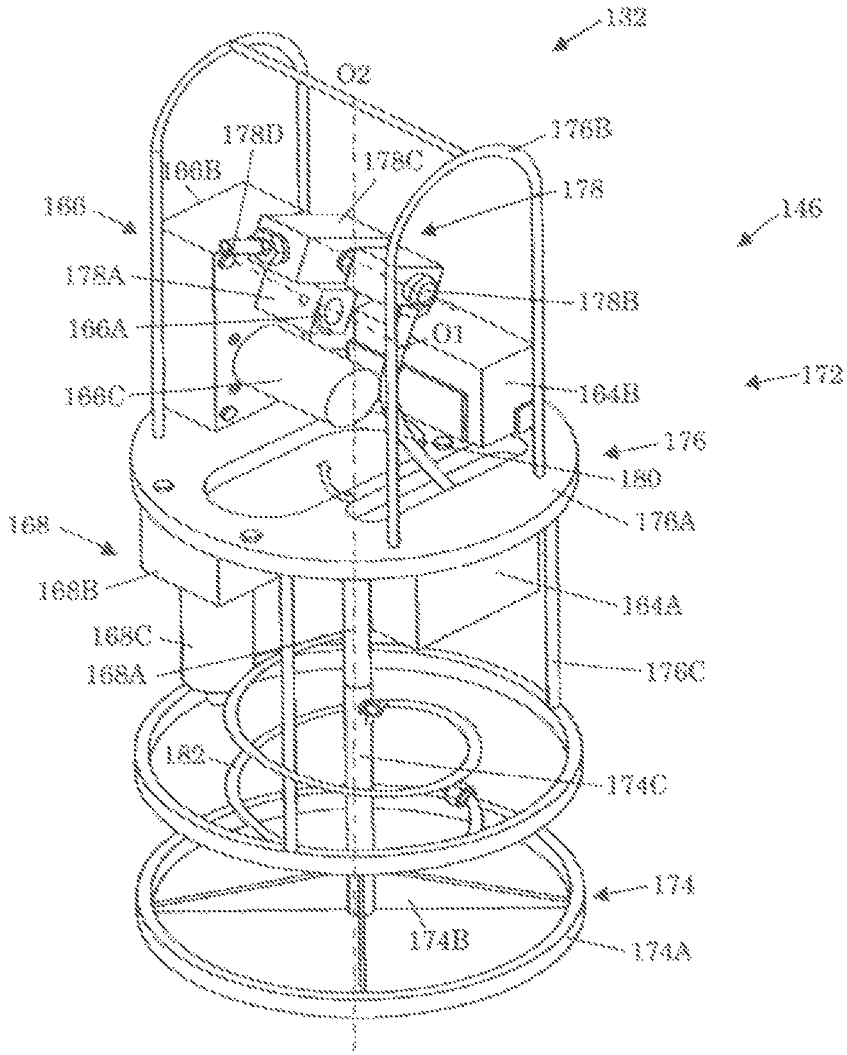
FIG. 2A is a perspective view illustrating a fluid discharger used in the dust suppression system in FIG. 1.

As illustrated in FIG. 2A, the first rotation device 166 has a first rotation shaft 166A, a casing 166B, a first motor part 166C, and a transmission mechanism contained in the casing 166B. In the first rotation device 166, the casted casing 166B supports the first rotation shaft 166A, the first motor part 166C, and the transmission mechanism. The transmission mechanism is configured to decelerate the output of the first motor part 166C and output the driving force of the first motor part 166C from the first rotation shaft 166A. The first rotation shaft 166A and the first motor part 166C are provided so as to protrude from the same side of the casing 166B. The first motor part 166C is provided with a potentiometer that outputs the displacement signal SO (the same applies to a second motor part 168C).

The second rotation device 168 is also provided with a second rotation shaft 168A, a casing 168B, a second motor part 168C, and a transmission mechanism, as illustrated in FIG. 2A. Since the second rotation device 168 is identical to the first rotation device 166, the description thereof is omitted.

Although not illustrated in FIG. 2A, the valve drive device 170 is a mechanism configured to limit the release of the fluid FD with a ball valve and includes an open/close valve 170A and a valve motor part 170B. The open/close valve 170A itself is contained in a pipe that constitutes a flow path of the fluid FD. To the pipe, introduction piping 180, which is connected to an introduction part 178B of an inclined member 178 (to be described later), and supply piping 182, which is connected to a fluid supply 186 (to be described later), are connected. In other words, the introduction piping 180 leads the fluid FD from the open/close valve 170A to the discharge nozzle 178D of the inclined member 178. The supply piping 182 leads the fluid FD from the fluid supply 186 to the open/close valve 170A of the fluid discharger 132. The valve drive device 170 is configured to lead the fluid FD horizontally in the pipe, and the open/close valve 170A is configured to shut off the fluid FD moving horizontally.

As illustrated in FIG. 2A, the support frame 172 has a support member 174 and the rotation member 176 that is supported by the support member 174 so that the rotation member 176 can rotate in a horizontal plane on the second rotation shaft 168A.

The support member 174 is made of steel (aluminum is also acceptable) and, as illustrated in FIG. 2A, has a ring part 174A, a support beam part 174B, and a shaft part 174C. The ring part 174A is annular in shape, and a bottom surface of the ring part 174A comes into direct contact with the scaffolding 106, building 104, or the like (instead of the support member, a part of a component of the scaffolding may be connected to the second rotation shaft). The support beam part 1746 is constituted of a plurality of plate-like members extending radially inward from the inside of the ring part 174A, and welded to the shaft part 174C located at the center of the ring part 174A. The shaft part 174C is a cylindrical member. The second rotation shaft 168A and the shaft part 174C are connected by fastening a bolt with the second rotation shaft 168A fitted inside the shaft part 174C (the axial center O2 of the second rotation shaft 168A coincides with the center of the support member 174).

The rotation member 176 is made of an aluminum material (aluminum or aluminum alloy), and as illustrated in FIG. 2A, has a turntable 176A on which the second rotation device 168 is detachably mounted, an upper frame 176B fixed to an upper surface of the turntable 176A, and a lower frame 176C fixed to a lower surface of the turntable 176A.

The turntable 176A is a disk-shaped member with two through holes, one for the introduction piping 180 to pass through and the other for the shape relief of the second rotation device 168. The rechargeable battery 164B is detachably disposed on the inside of the upper surface of the turntable 176A in a radial direction. In addition, the receiver 148, the control device 156, the power adapter 164A, the second rotation device 168, and the valve drive device 170 are each detachably disposed on the inside of the lower surface of the turntable 176A in the radial direction. The axial center O2 of the second rotation shaft 168A coincides with the center of the turntable 176A (rotation member 176).

As illustrated in FIG. 2A, the upper frame 176B includes a pair of inverted U-shaped standing frames that are erected on the turntable 176A across the axial center O2 of the second rotation shaft 168A, and a connecting frame that connects the tops of the standing frames. The standing frame is configured to detachably support the first rotation device 166 with the first rotary shaft 166A of the first rotation device 166 being on an upper side and the first motor part 166C being on a lower side. That is, the upper frame 176B supports the first rotation device 166 so that the first rotation shaft 166A is orthogonal to the second rotation shaft 168A. At this time, both the first rotation shaft 166A of the first rotation device 166 and the first motor part 166C that rotates the first rotation shaft 166A are directed to the inside of the rotation member 176 in the radial direction. The first rotation shaft 166A detachably supports the inclined member 178.

The inclined member 178 is made of an aluminum material and includes, as illustrated in FIG. 2A, a support part 178A, the introduction part 178B, a nozzle support part 178C, and the discharge nozzle 178D. The support part 178A is a cylindrical member, and the first rotation shaft 166A is detachably mounted inside the support part 178A. The introduction part 178B is a member with a flow path leading the fluid FD inside, and is supported by the support part 178A. In the case of attaching the support part 178A to the first rotation shaft 166A, the introduction part 178B leads the fluid FD from the introduction piping 180 in parallel to the first rotation shaft 166A. The nozzle support part 178C is a member inside which a flow path leading the fluid FD is provided, and is supported by the support part 178A. The nozzle support part 178C is connected to the introduction part 178B and leads the fluid FD, which is led to the introduction part 178B, to the discharge nozzle 178D facing outward in the radial direction. The discharge nozzle 178D is a cylindrical member, and the direction of the discharge nozzle 178D passes through the axial center O2 of the second rotation shaft 168A. The discharge nozzle 178D discharges the fluid FD in a direction controlled by the first rotation device 166. That is, the first rotation device 166 is configured to rotatably support the discharge nozzle 178D, which discharges the fluid FD, along the first rotation shaft 166A orthogonal to the second rotation shaft 168A. In a case in which the fluid FD is a foamy material, the foamy material is directly supplied from the fluid supply 186, but the discharge nozzle 178D may be configured to suck in air, for example (not illustrated). In this case, the fluid FD may be a raw material (liquid) for the foamy material, and the raw material for the foamy material may be synthesized from the liquid into the foamy material upon being discharged from the discharge nozzle 178D. In such a case, a large amount of the foamy material can be vigorously discharged (sprayed) from the discharge nozzle 178D. The shape of the discharge nozzle 178D may be made (remotely) different between a case in which the fluid FD is water and a case in which the fluid FD is a foamy material. Alternatively, the shape of the discharge nozzle 178D may be unified to accommodate foamy materials.

As illustrated in FIG. 2A, the lower frame 176C has a plurality of pillar frames standing along the periphery of the turntable 176A, and a ring frame that is annular in shape, disposed outside the control mechanism 146 in the radial direction, and supported by the plurality of pillar frames. The pillar frames are rod-shaped members and specifically disposed outside the receiver 148, the control device 156, the power adapter 164A, the second rotation device 168, and the valve drive device 170. Two elastic members (e.g., plate-shaped synthetic rubber) covering the lower frame 176C may be disposed on the periphery of the turntable 176A to cover the entire periphery.

The fluid discharger 132 is powered by the rechargeable battery 164B so that the rechargeable battery 164B can be easily replaced during inspection of the scaffolding 106 and the position of the fluid discharger 132 can be freely changed, but the fluid discharger 132 may be powered by a not-illustrated power generator.

Figure 2B:
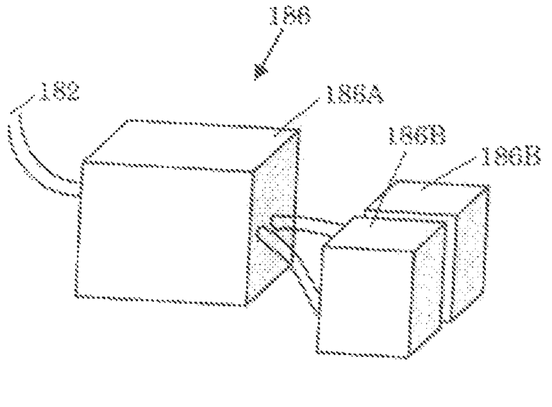
FIG. 2B is a schematic diagram illustrating a fluid supply for supplying a fluid to the fluid discharger in FIG. 2A.

As illustrated in FIGS. 2A and 2B, the fluid supply 186 is provided to supply the fluid FD to the fluid discharger 132 via the supply piping 182. As illustrated in FIG. 1, the fluid supply 186 is installed at a location where maintenance is relatively easy in a less fluctuating environment at the work site 100, for example, on the ground away from the work area 102. As illustrated in FIG. 2B, the fluid supply 186 includes a pump 186A and two tanks 186B. The pump 186A can increase the pressure of the fluid FD introduced from the tank 186B. The two tanks 186B store different kinds of fluid FD from each other. In the present embodiment, one of the tanks 186B holds water (including an aqueous solution with water as a main component), and the other of the tanks 186B holds a foamy material or a raw material for the foamy material. The fluid supply 186 is driven by a power supply connected to a not-illustrated power generator, for example. The tanks 186B may be switched manually or remotely by providing a button on the transmitter 134 and turning the button on and off.

Although the fluid FD may be supplied from one fluid supply 186 to one fluid discharger 132, the fluid FD may be supplied from one fluid supply 186 to a plurality of fluid dischargers 132. In that case, the plurality of fluid dischargers 132 may be connected to the one fluid supply 186 in parallel or in series (for example, in the case of parallel, the configuration may be used for a plurality of fluid dischargers 132 arranged in a plane. In the case of series, the configuration may be used for a plurality of fluid dischargers 132 arranged in a height direction of the scaffolding 106). In a case in which the fluid FD is water, the pump 186A may be eliminated and the supply piping 182 may be connected directly to a water tap. The supply piping 182 may be fixed to the scaffolding 106 surrounding the building 104.

Next, a dust suppression method using the dust suppression system 130 will be described, mainly using FIG. 1.

First, the scaffolding 106 is configured to surround an area required for demolition of the building 104 (including an area for repositioning of the work machine 110), and the curing sheet 108 is attached to the outside of the scaffolding 106. Here, the height of the scaffolding 106 is configured to be higher than the height of the building 104 to be demolished. Then, for example, the fluid discharger 132 is placed on the scaffolding 106 or building 104 so that the position of the discharge nozzle 178D is higher than the work area 102 of the building 104 to be demolished. The fluid discharger 132 may be simply placed on or, in some cases, fixed to the scaffolding 106. A plurality of fluid dischargers 132 are placed at different locations from each other, and the respective fluid dischargers 132 can discharge the fluid FD to the same work area (the area to be demolished) 102. The actual number and spacing of the fluid dischargers 132 can be appropriately determined in accordance with the distance of the fluid FD to be discharged (sprayed) from the fluid dischargers 132 and the amount of the fluid FD to be sprayed per hour.

Next, directing to the work area 102, one or more of the fluid dischargers 132 in the vicinity of the work area 102 are operated by remote operation by operating the transmitter 134 by a worker in the cab 112 or another worker. Then, a predetermined amount (an amount somewhat effective in suppressing dust dispersion or more) of the fluid FD is sprayed over a predetermined area (e.g., including up to an area where dust is likely to be generated by contact of the work attachment 116, even if the work attachment 116 does not come into direct contact with the area) from above the work area 102 with the discharge nozzles 178D. At this time, this spraying may be achieved by specifying the direction of the discharge nozzle 178D intermittently by remote operation. Alternatively, this spraying may be achieved by automatically reciprocating the discharge nozzle 178D in a predetermined range. In addition, due to wind and humidity, a foamy material and water may be sprayed as appropriate as the fluid FD.

Next, the work attachment 116 is brought into contact with the work area 102 where the fluid FD has been sprayed to demolish the work area 102. At this time, for example, the fluid FD is continuously sprayed from the fluid discharger 132 to effectively suppress the scattering of dust. At this time, the direction of the discharge nozzle 178D may be controlled intermittently by itself by remote operation, or the discharge nozzle 178D may reciprocate automatically. In a case in which the fluid FD is a foamy material, the spraying of the foamy material may be temporarily stopped and the foamy material may be made to disappear with water in order to confirm whether the demolition of the target work area 102 has been achieved.

Once the demolition of the work area 102 is accomplished, the work attachment 116 is moved for the next work area 102. Simultaneously, or earlier, the corresponding fluid dischargers 132 are operated and the next work area 102 is demolished with the work attachment 116. By repeating this process, demolition can proceed quickly from upper floors of the taller building 104. If dust is generated in a predetermined area even after demolition has already been completed, the area may be sprayed with the fluid FD using one or more fluid dischargers 132 with the discharge nozzles 178D in the first and second automatic modes.

Thus, according to the present embodiment, the control device 156 includes the first mode control unit 161A with the first automatic control unit 161AA and the first switching unit 161AH. That is, since the first switching unit 161AH can switch between the control signal SN and the control signal SH2, it is possible to control the discharge nozzle 178D at the first rotation angle j by remote operation, and it is also possible to automatically perform reciprocating control of the discharge nozzle 178D within the first rotation range jr.

In addition, in the present embodiment, the first switching unit 161AH is controlled by remote operation. Therefore, even without physically approaching the fluid discharger 132, it is possible, by remote operation, to switch between control of the discharge nozzle 178D at the first rotation angle j and automatic reciprocating control of the discharge nozzle 178D, thereby saving time and effort (amount of work and man-hours) required to switch between these two. Not limited to this, the first switching unit may be realized by a switch provided to the fluid discharger. In such a case, the function for remote operation can be omitted from the transmitter and receiver, which can promote cost reduction. Alternatively, the first switching unit may be controlled by remote operation while also being realized by a switch (automatic mode button and manual mode button) on the fluid discharger. In this case, both can be switched, and efficient operation of the fluid discharger can be achieved.

In the present embodiment, the first automatic control unit 161AA includes the first lower limit setting unit 161AC, the first upper limit setting unit 161AB, the first lower limit comparison unit 161AE, the first upper limit comparison unit 161AD, and the first signal reversing unit 161AF. Therefore, the discharge nozzle 178D can automatically reciprocate within the first rotation range jr by simple operation at low cost. Not limited to this, for example, the first rotation range jr may be fixed in advance to a specific angle range (90 degrees, 180 degrees, or the like) so that the discharge nozzle can automatically reciprocate. Alternatively, the discharge nozzle may be made to automatically reciprocate at a fixed time, instead of an angle.

In the present embodiment, the first lower limit setting unit 161AC and the first upper limit setting unit 161AB are set at the fluid discharger 132. Therefore, the time and effort required to set the first rotation range jr by remote operation and the configuration for transmitting data on the first rotation range jr to the fluid discharger 132 can be eliminated, thereby promoting cost reduction. Not limited to this, the first lower limit setting unit and the first upper limit setting unit may be set by remote operation. In this case, even if the setting of the fluid discharger is to be changed in the middle of work, it is not necessary to approach the fluid discharger, and high convenience can be achieved.

In the present embodiment, the fluid discharger 132 further includes the second rotation device 168, and the control device 156 includes the second mode control unit 161B including the second automatic control unit 161BA and the second switching unit 161BH. Therefore, since the second switching unit 161BH can switch between the control signal SV and the control signal SP2, it is possible, by remote operation, to control the discharge nozzle 178D at the second rotation angle q and to automatically perform reciprocating control of the discharge nozzle 178D within the second rotation range qr. For example, the second rotation device 168 can be controlled in the second automatic mode, and the first rotation device 166 can be controlled in the first manual mode. The opposite is true. Alternatively, both the first and second rotary devices 166 and 168 can be controlled in the automatic mode or in the manual mode. In other words, it is possible to optimize the spray pattern of the fluid FD according to a situation. Not limited to t his, the second rotation device may not be present, or even if the second rotation device is present, either the automatic mode or the manual mode may be provided.

In the present embodiment, the second switching unit 161BH is controlled by remote operation. Therefore, even without physically approaching the fluid discharger 132, it is possible, by remote operation, to switch between control of the discharge nozzle 178D at the second rotation angle q and automatic reciprocating control of the discharge nozzle 178D, thereby saving time and effort (amount of work and man-hours) required to switch between these two. Not limited to this, the second switching unit may be realized by a switch provided to the fluid discharger. In such a case, the function for remote operation can be omitted from the transmitter and receiver, which can promote cost reduction. Alternatively, the second switching unit may be controlled by remote operation while also being realized by a switch (automatic mode button and manual mode button) provided to the fluid discharger. In this case, both can be switched, and efficient operation of the fluid discharger can be achieved.

In the present embodiment, the second automatic control unit 161BA includes the second lower limit setting unit 161BC, the second upper limit setting unit 161BB, the second lower limit comparison unit 161BE, the second upper limit comparison unit 161BD, and the second signal reversing unit 161BF. Therefore, the discharge nozzle 178D can automatically reciprocate within the second rotation range qr by simple control at low cost. Not limited to this, for example, the second rotation range qr may be fixed in advance to a specific angle range (90 degrees, 180 degrees, or the like) so that the discharge nozzle can automatically reciprocate. Alternatively, the discharge nozzle may be made to automatically reciprocate at a fixed time, instead of an angle.

In the present embodiment, the second lower limit setting unit 161BC and the second upper limit setting unit 161BB are set at the fluid discharger 132. Therefore, the time and effort required to remotely set the second rotation range qr and the configuration for transmitting data on the second rotation range qr to the fluid discharger 132 can be eliminated, thereby prompting cost reduction. Not limited to this, the second lower limit setting unit and the second upper limit setting unit may be set by remote operation. In this case, even if the setting of the fluid discharger is to be changed in the middle of work, it is not necessary to approach the fluid discharger, and high convenience can be achieved.

In the present embodiment, the fluid FD includes water or a foamy material. Therefore, in a case in which the fluid FD is water, the building 104 can be effectively wetted. In a case in which the fluid FD is a foamy material, excessive discharge of water can be avoided, and the amount of water used can be greatly reduced as compared to the case of sprinkling only water, thus saving water. In addition, the generation of dust can be effectively suppressed.

In the present embodiment, remote operation is performed from the single transmitter 134 to the plurality of fluid dischargers 132. This means that the number of workers to operate the fluid dischargers 132 can be reduced and the plurality of fluid dischargers 132 can be operated efficiently.

In the present embodiment, the fluid dischargers 132 are placed on the scaffolding 106 or the building 104, instead of the work machine 110. In other words, the operations of the fluid dischargers 132 can be performed independently of the operations of the work machine 110. Therefore, the work area 102 can be quickly enclosed in advance with the fluid FD, and the demolition work can be proceeded in a short period of time while effectively suppressing the scattering of dust.

In the present embodiment, since the fluid discharger 132 is remotely controlled, it is possible to eliminate the need for placing water sprinkling workers in the vicinity of the work area 102 where the dust is to be generated. In other words, there is no need for workers who spray water from the high scaffolding 106, thus ensuring the occupational safety of the workers and consequently improving the work environment. Furthermore, since the degree of danger to the workers can be reduced, the cost of insurance and other accident response can also be reduced.

Also, in the present embodiment, switching between the first and second manual modes and the first and second automatic modes is realized by a combination of the two horizontal rotation instruction buttons 136A, the two vertical rotation instruction buttons 136B, and the two open-close instruction buttons 136C on the transmitter 134. For this reason, there is no need to install another button on the transmitter 134, and even with the addition of the above-described automatic modes, the cost increase can be kept to a minimum. Not limited to this, a button specific to the automatic modes may be provided on the transmitter.

That is, according to the present embodiment, in the dust suppression system 130, while the direction of the discharge nozzle 178D can be controlled by remote operation, the direction of the discharge nozzle 178D can automatically reciprocate within the predetermined range. Thus, it is possible to effectively control the plurality of fluid dischargers 132 by remote operation.

Although the present invention has been described with reference to the first embodiment, the present invention is not limited to the first embodiment. The present invention can be improved and the design can be changed within the scope of the invention without departing from its gist.

For example, in the first embodiment, since the fluid discharger 132 has a configuration such that the rotation directions of the first and second rotation devices 166 and 168 and the direction of the pressure of the fluid FD coincide with each other, it is necessary to increase the rotational torques of the first and second rotation devices 166 and 168 in consideration of fluctuation in the pressure of the fluid FD, but the present invention is not limited to this. For example, it may be as in a second embodiment illustrated in FIGS. 6A to 9C. In the second embodiment, a fluid discharger 232 has a horizontal shape (FIGS. 6A and 6B) that is long in an XY direction, and only the configuration thereof is different. Thus, the first digit of the reference numerals is changed from the first embodiment, and the description of components other than the fluid discharger 232 is omitted as much as possible.

In the present embodiment, as illustrated in FIGS. 6A, 6B, 7A, and 7B, the fluid discharger 232 includes a flow channel component 277, a support member 274, a rotation member 276, and a second rotation device 268.

As illustrated in FIGS. 6A, 6B, 7A, and 7B, the flow channel component 277 includes a fluid inlet port 277A, a second swivel joint structure 277B, L-shaped pipes 277E and 277G, an open/close valve 277F, a first swivel joint structure 278A, and a discharge nozzle 278D. From the fluid inlet port 277A, a fluid FD forcibly fed from a fluid supply is introduced through supply piping (FIG. 2B). The second swivel joint structure 277B includes a second fixed-side body 277C detachably fixed to a shaft 274C of a support member 274, and a second rotating-side body 277D fixed to the rotation member 276 and rotatable around the central axis (axial center O2) of the second fixed-side body 277C (that is, among the flow channel component 277, the fluid inlet port 277A and the second fixed-side body 277C are supported by the support member 274, and the second rotating-side body 277D, the L-shaped pipes 277E and 277G, the open/close valve 277F, the first swivel joint structure 278A, and the discharge nozzle 278D are supported by and fixed to the rotation member 276). The L-shaped pipes 277E and 277G are pipes made of L-shaped steel products, and the L-shaped pipe 277E is connected to the second rotating-side body 277D and the open/close valve 277F. The open/close valve 277F is, for example, a ball valve, and controls the amount of the fluid FD to be discharged by rotating an open/close shaft 277FA (around a rotational axis Rb). The L-shaped pipe 277G is connected to the open/close valve 277F and the first swivel joint structure 278A. The first swivel joint structure 278A includes a first fixed-side body 278B connected to the L-shaped pipe 277G, and a first rotating-side body 278C rotatable around the central axis (axial center O1) of the first fixed-side body 278B. The discharge nozzle 278D is attached to the first rotating-side body 278C. Therefore, the central axis (axial center O2) of the shaft 274C and the rotational axis (axial center O1) of the first swivel joint structure 278A are configured to be orthogonal to each other. The first rotating-side body 278C and the discharge nozzle 278D constitute an inclined member 278.

Figure 6A:
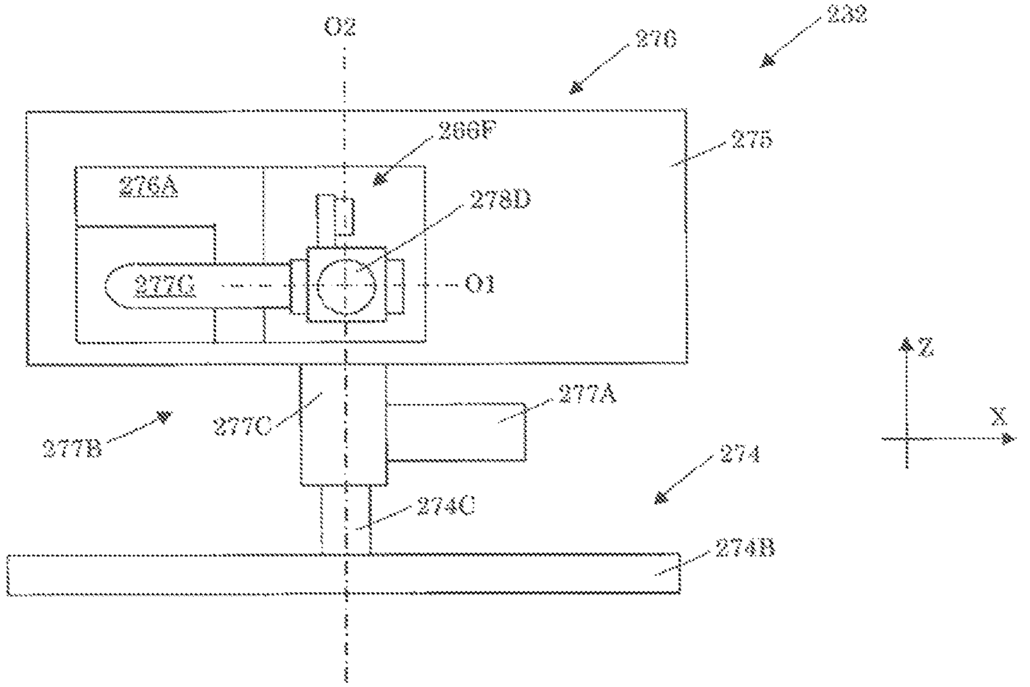
FIG. 6A is a front view of a fluid discharger of a dust suppression system according to a second embodiment of the present invention.
Figure 6B:
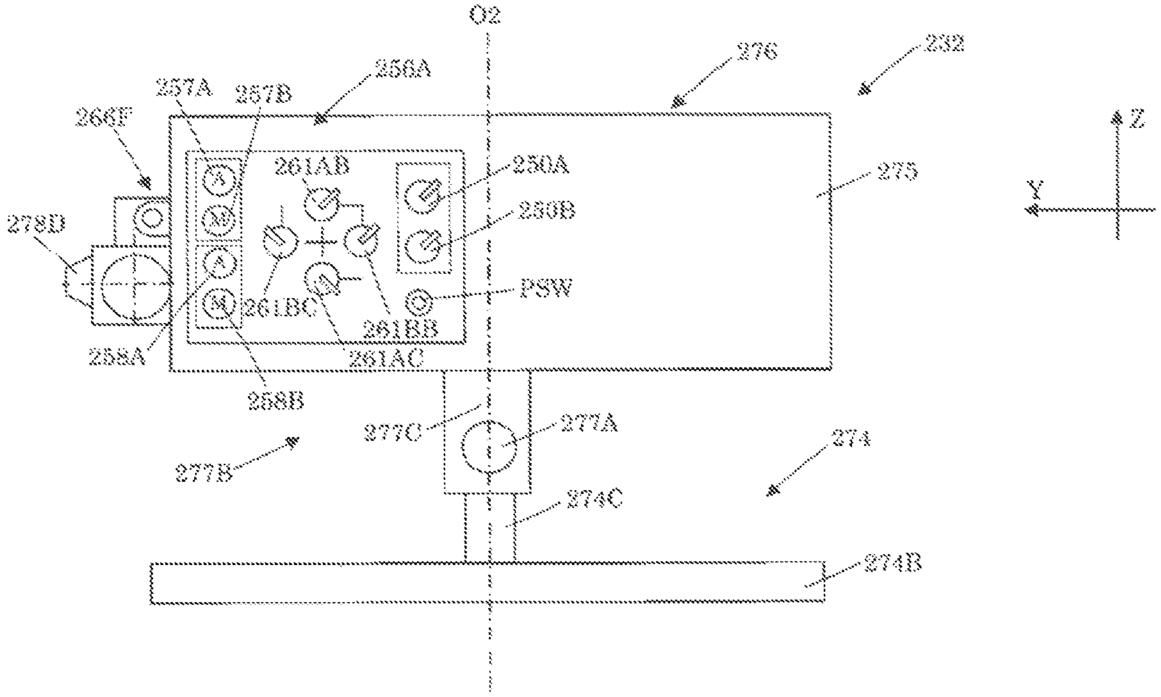
FIG. 6B is a side view illustrating the fluid discharger in FIG. 6A.

As illustrated in FIGS. 6A and 6B, the support member 274 includes a support beam 274B constituted of iron rods assembled radially, and the shaft 274C supporting the rotation member 276 via the second swivel joint structure 277B.

Figure 7A:
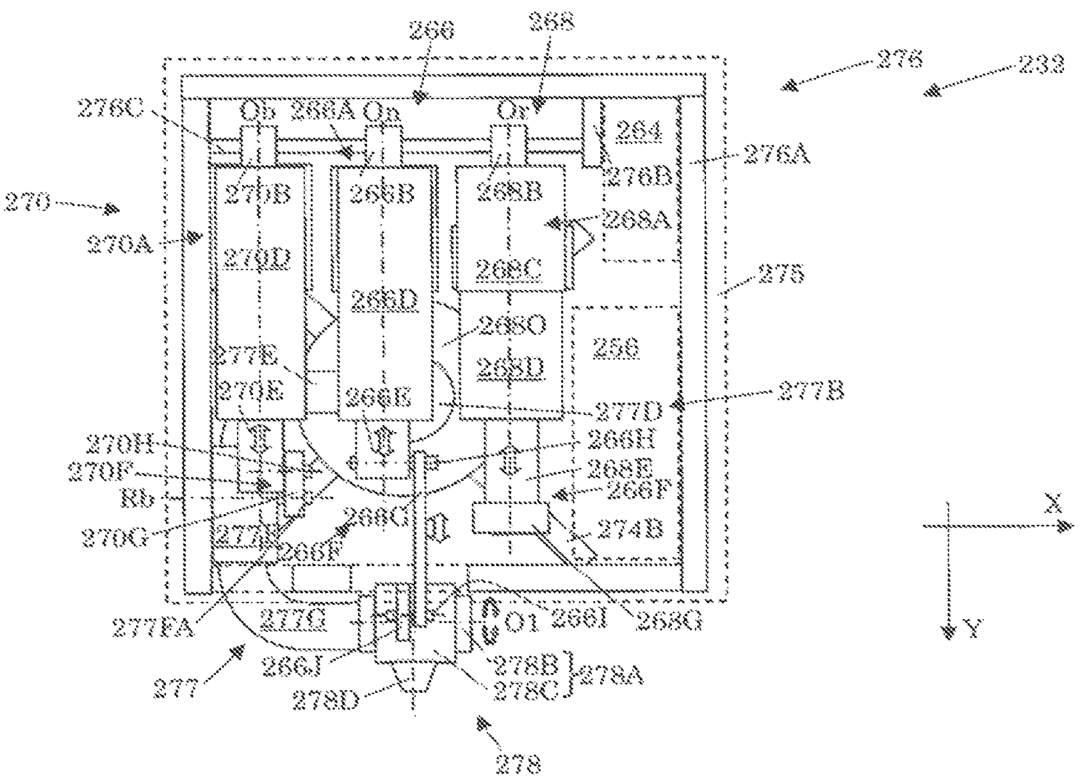
FIG. 7A is a top view of the fluid discharger in FIG. 6A in which a casing and the like are made transparent.
Figure 7B:
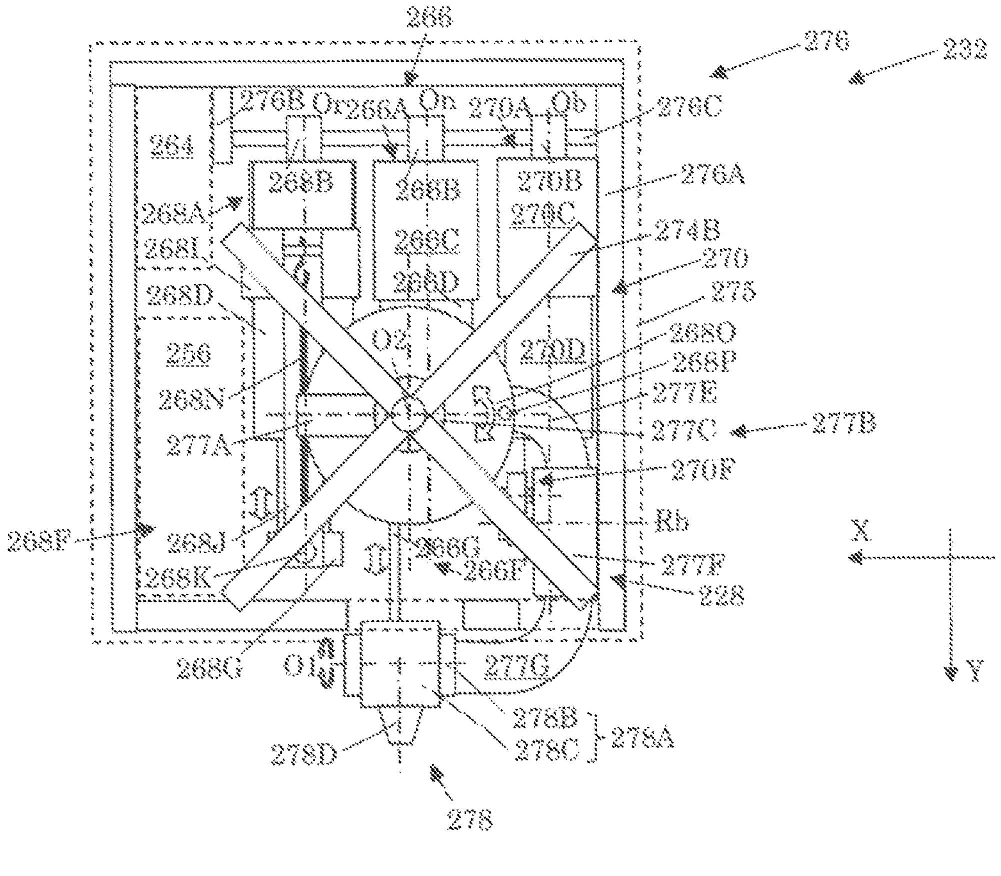
FIG. 7B is a bottom view of the fluid discharger in FIG. 6A in which the casing and the like are made transparent.

As illustrated in FIGS. 6A and 6B, the rotation member 276 is rotatable with respect to the shaft 274C of the support member 274. To the rotation member 276 (illustrated by dashed lines in FIGS. 7A and 7B), a rectangular parallelepiped-shaped casing 275 is attached (the rotation member 276 has a horizontal shape that is short in the Z direction and long in the X or Y direction in the present embodiment). The rotation member 276 includes a first rotation device 266, the second rotation device 268, a valve drive device 270, a control device 256, and a power supply 264 inside a support frame 276A, which is made of plate steel into a frame shape. The first rotation device 266 includes a first electric linear motion mechanism 266A and a first rotation mechanism 266F. The second rotation device 268 includes a second electric linear motion mechanism 268A and a second rotation mechanism 268F. The valve drive device 270 includes a third electric linear motion mechanism 270A and a third rotation mechanism 270F. In FIGS. 7A and 7B, the control device 256 and the power supply 264 are illustrated by dashed lines. The control device 256 is integrated with a receiver.

In the present embodiment, as illustrated in FIG. 6B, an input part 256A is provided on the side of the fluid discharger 232. On the input part 256A, a frequency selector 250A, a number selector 250B, automatic mode buttons 257A and 258A, manual mode buttons 257B and 258B, a first lower limit setting unit 261AC, a first upper limit setting unit 261AB, a second lower limit setting unit 261BC, a second upper limit setting unit 261BB, and a power switch PSW are provided. The frequency selector 250A and the number selector 250B are provided to the receiver and have the same functions as those described in the first embodiment. The first lower limit setting unit 261AC, the first upper limit setting unit 261AB, the second lower limit setting unit 261BC, and the second upper limit setting unit 261BB also have the same functions as those described in the first embodiment. By pressing the automatic mode buttons 257A and 258A, the control signals SI and SQ outputted from the first and second switching units become the control signals SN and SV, respectively. In other words, the automatic mode buttons 257A and 258A are pressed to enter the first and second automatic modes, respectively. By pressing the manual mode buttons 257B and 258B, the control signals SI and SQ outputted from the first and second switching units become control signals SH2 and SP2, respectively. In other words, the manual mode buttons 257B and 258B are pressed to enter the first manual mode and the second manual mode. The power switch PSW integrally turns on/off the control device 256 and the receiver.

As shown in FIGS. 7A and 7B, the first, second, and third electric linear motion mechanisms 266A, 268A, and 270A include mount parts 266B, 268B, and 270B, motor parts 266C, 268C, and 270C, first, second, and third support parts 266D, 268D, and 270D, and first, second, and third movable parts 266E, 268E, 270E, respectively. The mount parts 266B, 268B, and 270B are supported by the support frame 276A via a support rod 276C and a holder part 276B. That is, an end of the first support part 266D, an end of the second support part 268D, and an end of the third support part 270D are configured to be rotatably axially supported by the support rod 276C. Also, the first electric linear motion mechanism 266A, the second electric linear motion mechanism 268A, and the third electric linear motion mechanism 270A are configured to be disposed in the same direction in the rotation member 276. However, since only the second electric linear motion mechanism 268A effectively positions and drives the second rotation mechanism 268F, the positional relationship of the motor part 268C and the second support part 268D in the Z direction is opposite from that of the first electric linear motion mechanism 266A and the third electric linear motion mechanism 270A (such a positional relationship does not necessarily have to be maintained).

The motor parts 266C, 268C, and 270C contain, for example, electric motors. The first, second, and third support parts 266D, 268D, 270D contain ball screws, for example, and rotation of the electric motors is converted into rotation of the ball screws. The first, second and third movable parts 266E, 268E, 270E are linearly movable in the directions of movement axes On, Or and Ob, respectively, by the rotation of the ball screws. In addition, not-illustrated potentiometers are provided to the motor parts 266C and 268C respectively, and displacement signals SO and SW are outputted (the potentiometers may be a linear type of device and provided to the first, second and third support parts 266D, 268D and 270D, and displacement signals SO and SW may be outputted in accordance with the amounts of movement of the first, second and third movable parts 266E, 268E, and 270E).

Figure 8A:
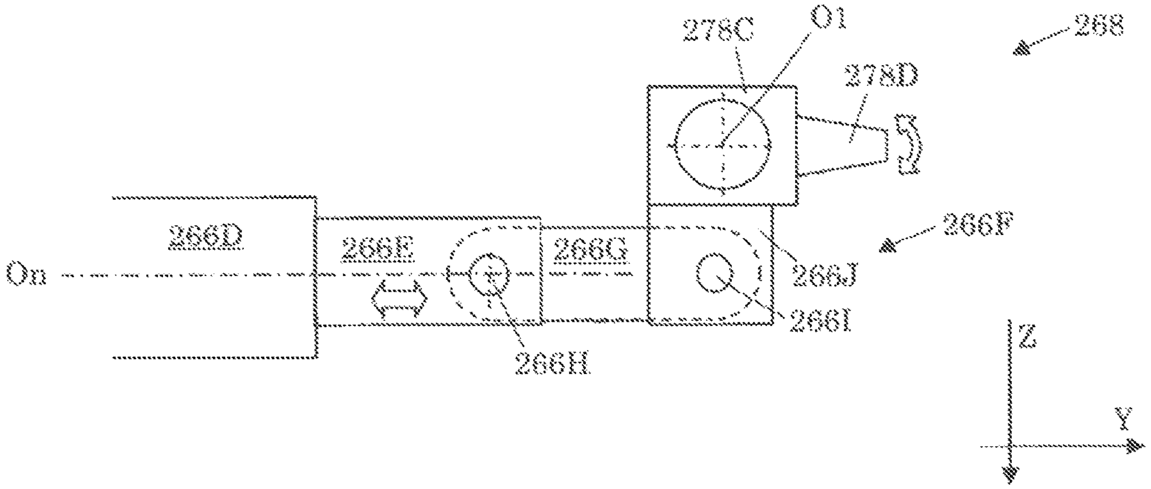
FIG. 8A is a side view illustrating a configuration around a discharge nozzle of the fluid discharger in FIG. 6A.

As illustrated in FIG. 8A, the first rotation mechanism 266F has a plate-like first connection part 266G between the first movable part 266E and a first lever 266J provided on the first rotating-side body 278C of the first swivel joint structure 278A, and the first connection part 266G is connected to the first movable part 266E and the first lever 266J by pins 266H and 266I, respectively. The angular relationship between the discharge nozzle 278D and the first lever 266J is 90 degrees, and the first connection part 266G is connected to the first lever 266J in an extended form.

Figure 8B:
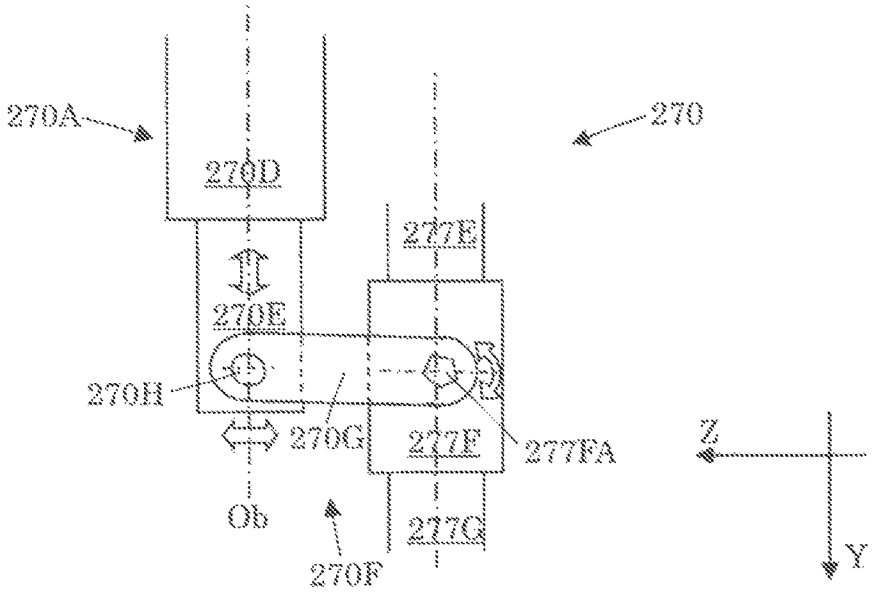
FIG. 8B is a side view illustrating a configuration around an open/close valve of the fluid discharger in FIG. 6A.

As illustrated in FIG. 8B, the third rotation mechanism 270F converts linear motion of the third movable part 270E into rotational motion to open and close the open/close valve 277F to regulate the amount of the fluid FD to be discharged from the discharge nozzle 278D. Specifically, the third rotation mechanism 270F is configured so that the third lever 270G provided on the open/close shaft 277FA of the open/close valve 277F and the third movable part 270E are connected by a pin 270H. Therefore, by motion of the third movable part 270E, a movement axis Ob swingingly rotates around the support rod 276C.

Figure 9A:
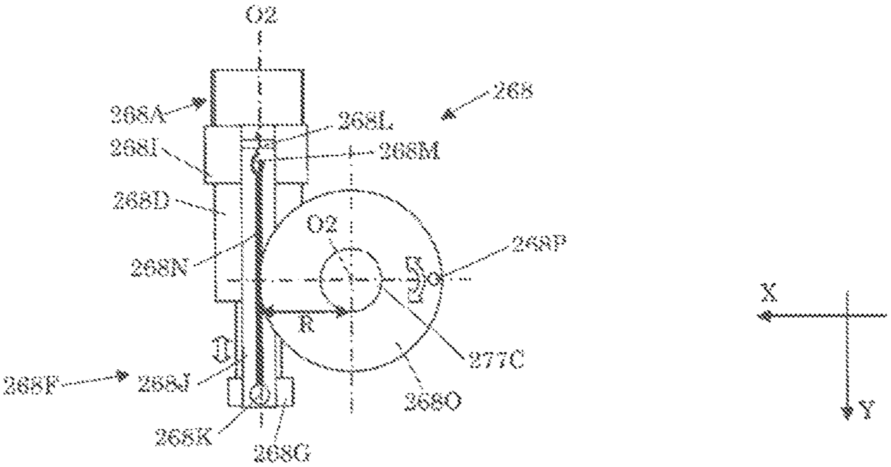
FIG. 9A is a bottom view illustrating a second rotation mechanism that rotates a rotation member of the fluid discharger in FIG. 6A.
Figure 9B:
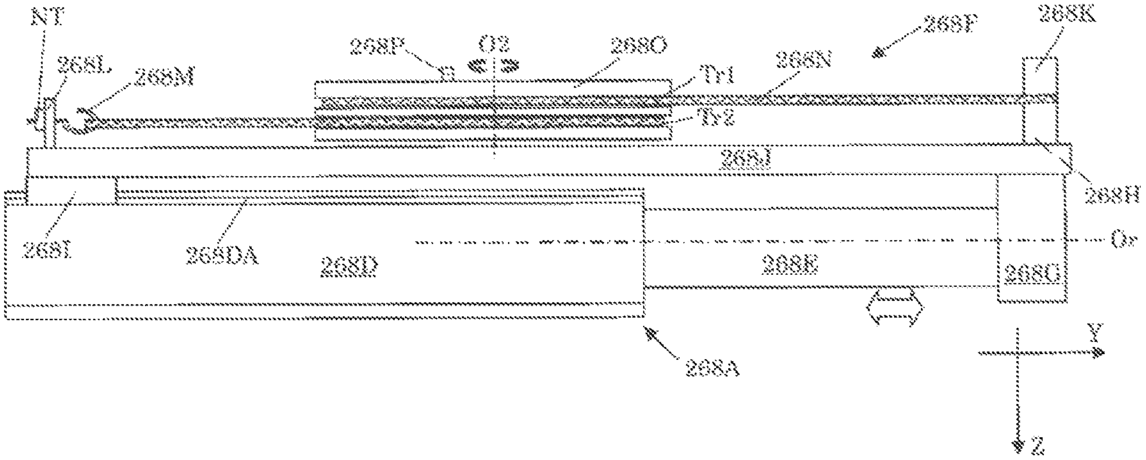
FIG. 9B is a side view illustrating the second rotation mechanism in FIG. 9A.
Figure 9C:
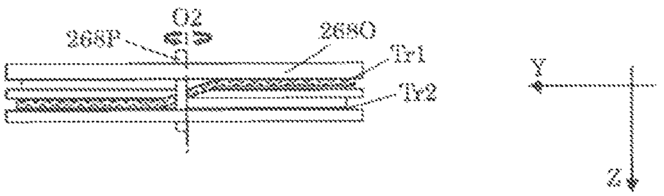
FIG. 9C is a side view illustrating the relationship between a pulley and a wire of the second rotation mechanism in FIG. 9B.

As illustrated in FIGS. 9A, 9B, and 9C, the second rotation mechanism 268F is provided with a base member 268J, a metal wire (string-like member: it may be a resin or metal chain or a belt) 268N, and a pulley 268O. The base member 268J is a plate-like member that is longer than the second movable part 268E in the direction of the movement axis Or. One end of the base member 268J is attached to the second movable part 268E via an attachment part 268G. The attachment part 268G is attached to the second movable part 268E by a pin 268H. The other end of the base member 268J is movably supported by a side surface 268DA of the second support part 268D via a slider part 268I fixed to a lower surface of the base member 268J. A surface of the slider part 268I that is in contact with the side surface 268DA is shaped in accordance with the side surface 268DA to be engaged with the side surface 268DA. As a result, the direction and motion of the base member 268J can be stabilized (not limited to this, the slider part may be omitted).

As illustrated in FIG. 9B, a retaining part 268K to which one end of the wire 268N is attached is attached to the position of the pin 268H on an upper surface of the base member 268J. The other end of the wire 268N is attached via a hook 268M to a stop part 268L provided on the other end of the base member 268J. One end of the hook 268M is in the shape of the letter U to allow the wire 268N to be suspended, and the other end is a spiral to which a nut NT can be screwed. Therefore, the movement axis Or of the second movable part 268E coincides with the direction of a straight line connecting the hook 268M and the retaining part 268K. By screwing the nut NT from outside the stop part 268L onto the screw of the hook 268M the tension of the wire 268N disposed between the retaining part 268K and the hook 268M via the pulley 268O can be flexibly adjusted. That is, the wire 268N is held at a predetermined tension along the movement axis Or of the second movable part 268E on the base member 268J. Here, the predetermined tension means a tension at which the pulley 268O can be relatively rotated (the rotation member 276 is rotated relative to the support member 274) without slack in the wire 268N.

Here, as illustrated in FIG. 9A, the pulley 268O is fixed to the second fixed-side body 277C of the second swivel joint structure 277B. The pulley 268O is in the shape of a disk with a radius R and has two grooves Tr1 and Tr2 on entire outer circumference (FIGS. 9B and 9C; however, the grooves Tr1 and Tr2 become one at one point at which a stop part 268P is provided). By engaging and disengaging the wire 268N in each of the two grooves Tr1 and Tr2, the wire 268N is prevented from catching each other, and relative rotation of the pulley 268O is smoothly realized. In other words, the pulley 268O has the grooves Tr1 and Tr2 provided on its outer circumference engaged with the wire 268N, and is fixed to the shaft 274C. The wire 268N is arranged around the entire circumferences of the grooves Tr1 and Tr2 and is in the form of crossing.

As illustrated in FIG. 9A, the positional relationship between the pulley 268O and the base member 268J (i.e., the second electric linear motion mechanism 268A) is designed such that a straight line connecting the retaining part 268K and the hook 268M is tangent to the pulley 268O. Therefore, the required length of the wire 268N can be minimized, and unintentional slack of the wire 268N can be prevented.

As described above, according to the present invention, the first rotation mechanism 266F converts linear motion of the first movable part 266E into rotational motion to rotationally displace the first rotating-side body 278C. That is, since pressure fluctuation of the fluid FD is applied in the direction of the rotational axis O1 (axial center O1) of the first rotating-side body 278C, the effect of the pressure fluctuation is in substantial around the rotational axis O1 (axial center O1) of the first swivel joint structure 278A. Therefore, it is possible to minimize a tolerance range necessary to cope with the pressure fluctuation of the fluid FD for output of the first electric linear motion mechanism 266A. Also, since the first electric linear motion mechanism 266A rotates the discharge nozzle 278D, it is not necessary to install a separate limit switch to limit the direction of the discharge nozzle 278D like a rotation device, thus achieving cost reduction.

According to the present embodiment, the first lever 266J is provided on the first rotating-side body 278C, and the first rotation mechanism 266F includes the first connection part 266G connecting the first movable part 266E and the first lever 266J. As a result, the first rotation mechanism 266F can be made into a simple structure, which allows reduction in size and cost.

According to the present embodiment, the fluid discharger 232 includes the second swivel joint structure 277B that has the second rotating-side body 277D supported by the rotation member 276 and the second fixed-side body 277C disposed on the support shaft 274C. Thus, pressure fluctuation of the fluid FD is applied in the direction of the rotational axis O2 (axial center O2) of the second rotating-side body 277D, and the effect of the pressure fluctuation is in substantial around the rotational axis O2 (axial center O2)

of the second swivel joint structure 277B. Therefore, it is possible to minimize a tolerance range necessary to cope with the pressure fluctuation of the fluid FD for output of the second electric linear motion mechanism 268A, which rotates the second rotating-side body 277D.

According to the present embodiment, the open/close shaft 277FA of the open/close valve 277F is provided with a third lever 270G, and the third rotation mechanism 270F includes a pin 270H that connects the third movable part 270E and the third lever 270G. Therefore, the third rotation mechanism 270F can have a simple configuration, and axis alignment with the open/close shaft 277FA can be easily performed. That is, it is possible to achieve reduction in size and cost.

According to the present embodiment, the third electric linear motion mechanism 270A, the third rotation mechanism 270F, and the open/close valve 277F are supported by the rotation member 276. Therefore, the number of components directly supported by the support member 274 can be reduced, and the support member 274 can be easily replaced. Also, it is possible to efficiently arrange the first electric linear motion mechanism 266A, the second electric linear motion mechanism 268A, and the third electric linear motion mechanism 270A in the rotation member 276, which further promotes downsizing and weight reduction.

According to the present embodiment, the end of the first support part 266D, the end of the second support part 268D, and the end of the third support part 270D are rotatably axially supported. Therefore, it is possible to easily attach the first electric linear motion mechanism 266A, the second electric linear motion mechanism 268A, and the third electric linear motion mechanism 270A.

According to the present embodiment, the first electric linear motion mechanism 266A, the second electric linear motion mechanism 268A, and the third electric linear motion mechanism 270A are disposed in the same direction in the rotation member 276. Therefore, the first electric linear motion mechanism 266A, the second electric linear motion mechanism 268A, and the third electric linear motion mechanism 270A can collectively respond to factors of performance degradation due to external environmental changes. Specifically, gaps between the first movable part 266E and the first support part 266D, between the second movable part 268E and the second support part 268D, and between the third movable part 270E and the third support part 270D can be directed in the same direction, and moisture capable of entering into the first electric linear motion mechanism 266A, the second electric linear motion mechanism 268A, and the third electric linear motion mechanism 270A from the gaps can be effectively cut off. Also, this configuration can promote miniaturization and weight reduction.

According to the present embodiment, since all of the first electric linear motion mechanism 266A, the second electric linear motion mechanism 268A, and the third electric linear motion mechanism 270A are aligned horizontally, the shape of the fluid discharger 232 is made short in the Z direction, relative to the X and Y directions, and the center of gravity is made lower. That is, according to the present embodiment, the fluid discharger 232 is further prevented from falling over.

According to the present embodiment, since the pulley 268O has the constant radius R, the rotational torque of the rotation member 276 by the second rotation mechanism 268F can be made constant. Also, the amount of rotation of the rotation member 276 that can be realized by the second rotation mechanism 268F can be increased. In the present embodiment, although the wire 268N has one winding on the pulley 268O, the greater the number of windings (the longer the distance over which the wire 268N and the pulley 268O are engaged), the greater the amount of rotation of the rotation member 276 can be.

According to the present embodiment, the fluid discharger 232 also has the two automatic mode buttons 257A and 258A and manual mode buttons 257B and 258B. Moreover, as in the first embodiment, it is possible to control the first and second switching units even from the transmitter. Therefore, either from the transmitter or from the fluid discharger 232, it is possible to switch between the first automatic mode and the first manual mode and between the second automatic mode and the second manual mode, thus allowing the fluid discharger 232 to be operated more efficiently.

In this way, the present embodiment makes it possible to precisely discharge the fluid FD from the fluid discharger 232 to the predetermined work area, while further reducing power consumption and size.

A mechanism similar to the second rotation mechanism used in the present embodiment may be used instead of the first rotation mechanism or the third rotation mechanism. Alternatively, the first rotation device, the second rotation device, and the third rotation device may be mounted on a work machine as an opening/closing device for an open/close valve that regulates the amount of fluid FD in discharging the fluid FD from the work attachment of the work machine.

According to the above-described embodiments, the fluid discharger is located on the scaffolding and a pressure feeding mechanism is located on the ground, but the present invention is not limited to this. For example, the fluid discharger may simply be placed on the object to be worked (including the ground), and the pressure feeding mechanism may be placed next to the fluid discharger at the same location.

According to the above-described embodiments, the fluid supply is provided to supply the fluid FD to the fluid discharger via the introduction piping, but the present invention is not limited to this. The fluid discharger and the fluid supply may be integrated.

According to the above-described embodiments, the fluid FD includes water or the foamy material, but the present invention is not limited to this. The fluid FD may be water only or a foamy material only.

According to the above-described embodiment, the plurality of fluid dischargers are placed at different positions from each other, and the fluid FD from each of the fluid dischargers can be discharged to the same work area, but the present invention is not limited to this. The fluid dischargers need not be able to spray the fluid FD to the same work area.

According to the above-described embodiments, there is one discharge nozzle and the different kinds of fluid FD are supplied to the discharge nozzle by switching the tanks, but the present invention is not limited to this. For example, the different kinds of fluid FD may be supplied to the discharge nozzle in different systems.

According to the above-described embodiments, there was one work machine at the work site, but the present invention is not limited to this. A plurality of work machines may be used.

According to the above-described embodiments, the fluid FD was discharged only from the fluid discharger, but the present invention is not limited to this. The fluid FD may also be sprayed from a work part of the work machine. In such a case, the work area can be surrounded by the fluid FD from more than one aspect, and the dust dispersion generated at the work area can be effectively suppressed. Also, the number of fluid dischargers used at the work site can be reduced. Therefore, it is possible to reduce a load on the control of the fluid dischargers, and also suppress dust dispersion at lower cost.

In the above-described embodiments, the so-called 'crusher_ is described as an example as the work machine, but the application of the present invention is not limited to this. For example, the same effect can be obtained by applying the invention to a pile driver, a pile extractor, a bulldozer, a tractor excavator, a power shovel, a backhoe, a dragline, a clamshell, a crawler drill, an earth drill, a crane, a road cutter, a breaker, and the like. In short, the present invention can be widely applied to work machines that perform work that may generate dust in civil engineering work, construction work, or demolition work.

INDUSTRIAL APPLICABILITY

The present invention can be used at a site of work that generates dust, such as in civil engineering work, construction work, demolition work, or the like, and is particularly suitably used in demolition work, repair work, or the like of a solid structure.

REFERENCE SIGNS LIST

100 work site
102 work area
104 building (object to be worked)
106 scaffolding
108 curing sheet
110 work machine
112 cab
114 arm
116 work attachment
118 work part
130 dust suppression system
132, 232 fluid discharger
134 transmitter
136 control signal input
136A horizontal rotation instruction button
136B vertical rotation instruction button
136C open-close instruction buttons
138, 150 CH selector
138A, 150A, 250A frequency selector
138B, 150B, 250B number selector
140, 152 local oscillator
142 modulation circuit
144, 164, 264 power supply
146 control mechanism
148 receiver
154 demodulator circuit
156, 256 control device
156A, 256A input unit
158 logic circuit
160 switch circuit
161A first mode control unit
161AA first automatic control unit
161AB, 261AB first upper limit setting unit
161AC, 261AC first lower limit setting unit
161AD first upper limit comparison unit
161AE first lower limit comparison unit
161AF first signal reversing unit
161AG, 161BG signal holding unit
161AH first switching unit
161B second mode control unit
161BA second automatic control unit
161BB, 261BB second upper limit setting unit
161BC, 261BC second lower limit setting unit
161BD second upper limit comparison unit
161BE second lower limit comparison unit
161BF second signal reversing unit
161BH second switching unit
162 drive circuit
162A first drive circuit
162B second drive circuit
162C valve drive circuit
164A power adapter
164B rechargeable battery
166, 266 first rotation device
166A first rotation shaft
166B, 168B, 275 casing
166C first motor part
168, 268 second rotation device
168A second rotation shaft
168C second motor part
170, 270 valve drive device
170A, 277F open/close valve
170B valve motor part
172 support frame
174, 274 support member
174A ring part
174B, 274B support beam part
174C, 274C shaft part
176, 276 rotation member
176A turntable
176B upper frame
176C lower frame
178, 278 inclined member
178A support part
178B introduction part
178C nozzle support part
178D, 278D discharge nozzle
180 introduction piping
182 supply piping
186 fluid supply
186A pump
186B tank
257A, 258A automatic mode button
257B, 258B manual mode button
266A first electric linear motion mechanism
266B, 268B, 268G, 270B mount part
266C, 268C, 270C motor part
266D first support part
266E first movable part
266F first rotation mechanism
266G first connection part
266H, 266I, 270H, 268H pin
266J first lever
268A second electric linear motion mechanism
268D second support part
268DA side surface
268E second support part
268F second rotation mechanism
268I slider part
268J base member
268K retaining part
268L, 268P stop part
268M hook
268N wire
268O pulley
270A third electric linear motion mechanism
270D third support part

270E third movable part
270F third rotation mechanism
270G third lever
276A support frame
276B holder part
276C support rod
277 flow channel component
277A fluid inlet port
277B second swivel joint structure
277C second fixed-side body
277D second rotating-side body
277E, 277G L-shaped pipe
277FA open/close shaft
278A first swivel joint structure
278B first fixed-side body
278C first rotating-side body
DI diode
FD fluid
fi, fk carrier frequency
IN1, IN2 NOT circuit
ND NAND circuit
NT nut
On, Ob, Or movement axis
O1, O2 axial center
On1, On2 ON-side terminal
Off1, Off2 OFF-side terminal
PSW power switch
Rb rotational axis
SA, SD, SG, SH, SH1, SH2, SI, SL, SM SN, SN1, SN2, SP, SP1, SP2, SQ, ST, SU, SV, SV1, SV2, SX control signal
SB, SD1, SF identification signal
SE reception signal
SC transmission signal
SO, SW displacement signal
SJ, SR upper limit signal
SK, SS lower limit signal
Tr1, Tr2 groove
j first rotation angle
j0 first rotation displacement angle
jr first rotation range
j1, j2, q1, q2 angle
jC, qC center angle
q second rotation angle
q0 second rotation displacement angle
qr second rotation range

The invention claimed is:

1. A dust suppression system comprising one or more fluid dischargers configured to discharge a fluid capable of suppressing generation of dust to a work area of an object to be worked by remote operation, wherein:

the fluid discharger includes a discharge nozzle configured to discharge the fluid, a first rotation device configured to rotate the discharge nozzle, and a control device configured to control the first rotation device by remote operation;

the control device includes a first mode control unit including a first automatic control unit configured to automatically perform reciprocating control of the discharge nozzle in a first rotation range set for each of the fluid dischargers, and a first switching unit configured to switch between a first automatic signal to be outputted from the first automatic control unit and a first operation signal to rotate the discharge nozzle by a first rotation angle designated by the remote operation; and the first automatic control unit includes: a first lower limit setting unit configured to set a lower limit angle of the first rotation range; a first upper limit setting unit configured to set an upper limit angle of the first rotation range; a first lower limit comparison unit configured to compare between a first lower limit angle set by the first lower limit setting unit and a first rotation displacement angle outputted from the first rotation device; a first upper limit comparison unit configured to compare between a first upper limit angle set by the first upper limit setting unit and the first rotation displacement angle; and a first signal reversing unit configured to, in a case in which a result of either the first lower limit comparison unit or the first upper limit comparison unit is different from a previous result, reverse the first automatic signal that was outputted last time and output the reversed signal.

2. The dust suppression system according to claim 1, wherein the first switching unit is controlled by remote operation.

3. The dust suppression system according to claim 1, wherein the first lower limit setting unit and the first upper limit setting unit are set in the fluid discharger.

4. The dust suppression system according to claim 1, wherein:

the fluid discharger further includes a second rotation device that is controlled by the control unit to rotate the discharge nozzle around a rotational axis orthogonal to a rotational axis of the first rotation device; and the control unit includes a second mode control unit including a second automatic control unit configured to automatically perform reciprocating control of the discharge nozzle in a second rotation range set for each of the fluid dischargers; and a second switching unit configured to switch between a second automatic signal to be outputted from the second automatic control unit and a second operation signal to rotate the discharge nozzle by a second rotation angle designated by the remote operation.

5. The dust suppression system according to claim 4, wherein the second switching unit is controlled by remote operation.

6. The dust suppression system according to claim 4, wherein the second automatic control unit includes: a second lower limit setting unit configured to set a lower limit angle of the second rotation range; a second upper limit setting unit configured to set an upper limit angle of the second rotation range; a second lower limit comparison unit configured to compare between a second lower limit angle set by the second lower limit setting unit and a second rotation displacement angle outputted from the second rotation device; a second upper limit comparison unit configured to compare between a second upper limit angle set by the second upper limit setting unit and the second rotation displacement angle; and a second signal reversing unit configured to, in a case in which a result of either the second lower limit comparison unit or the second upper limit comparison unit is different from a previous result, reverse the second automatic signal that was outputted last time and output the reversed signal.

7. The dust suppression system according to claim 6, wherein the second lower limit setting unit and the second upper limit setting unit are set in the fluid discharger.

8. The dust suppression system according to claim 1, wherein the fluid includes water or a foamy material.

9. The dust suppression system according to claim 1, wherein the remote operation is performed from a single transmitter to the multiple fluid dischargers.

* * * * *